(12) United States Patent
Mittal et al.

(10) Patent No.: US 11,146,492 B2
(45) Date of Patent: Oct. 12, 2021

(54) METHOD AND SYSTEM FOR OPTIMIZING SERVICE DEVICE TRAFFIC MANAGEMENT

(71) Applicant: Arista Networks, Inc., Santa Clara, CA (US)

(72) Inventors: Anuraag Mittal, Santa Clara, CA (US); Krishna Ram Kuttuva Jeyaram, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 413 days.

(21) Appl. No.: 16/391,520

(22) Filed: Apr. 23, 2019

(65) Prior Publication Data
US 2020/0252338 A1     Aug. 6, 2020

Related U.S. Application Data

(60) Provisional application No. 62/800,228, filed on Feb. 1, 2019.

(51) Int. Cl.
| | |
|---|---|
| G06F 15/173 | (2006.01) |
| H04L 12/813 | (2013.01) |
| H04L 12/24 | (2006.01) |
| H04L 29/06 | (2006.01) |
| H04L 29/08 | (2006.01) |

(52) U.S. Cl.
CPC .......... *H04L 47/20* (2013.01); *H04L 41/0893* (2013.01); *H04L 63/0263* (2013.01); *H04L 67/16* (2013.01); *H04L 67/2814* (2013.01); *H04L 67/2852* (2013.01)

(58) Field of Classification Search
CPC . H04L 47/20; H04L 41/0893; H04L 63/0263; H04L 67/16; H04L 67/2814; H04L 67/2852
See application file for complete search history.

(56) References Cited

U.S. PATENT DOCUMENTS

| | | | |
|---|---|---|---|
| 2009/0228954 A1* | 9/2009 | Hu .................... | H04M 15/66 726/1 |
| 2013/0212641 A1* | 8/2013 | Stiekes ............... | H04L 63/306 726/1 |
| 2014/0010083 A1* | 1/2014 | Hamdi ................ | H04L 47/10 370/235 |
| 2014/0095724 A1* | 4/2014 | Yoakum ............. | H04L 29/08054 709/228 |
| 2014/0317684 A1* | 10/2014 | Porras ................ | H04L 63/20 726/1 |
| 2014/0376367 A1* | 12/2014 | Jain .................... | H04L 63/0263 370/230 |

(Continued)

*Primary Examiner* — Oleg Survillo
(74) *Attorney, Agent, or Firm* — Chamberlain, Hrdlicka, White, Williams & Aughtry

(57) ABSTRACT

A method and system for optimizing service device traffic management. Specifically, the method and system disclosed herein entail filtering network traffic flows directed to service devices, distributed throughout a network, for inspection. Through the aforementioned filtering, a targeted subset of network traffic flows may be identified and excluded from service device processing. The filtering thus alleviates traffic congestion and improves traffic throughput at the service device(s), thereby optimizing the management and/or processing of network traffic flows redirected to the service device(s).

20 Claims, 12 Drawing Sheets

(56) References Cited

U.S. PATENT DOCUMENTS

| | | | |
|---|---|---|---|
| 2016/0182370 A1* | 6/2016 | Stokking | H04L 43/12 |
| | | | 370/392 |
| 2016/0359913 A1* | 12/2016 | Gupta | H04L 43/0864 |
| 2017/0019335 A1* | 1/2017 | Schultz | H04L 47/2483 |
| 2017/0155681 A1* | 6/2017 | Ashley | H04L 47/00 |
| 2017/0331739 A1* | 11/2017 | Sharma | H04L 63/02 |
| 2018/0337849 A1* | 11/2018 | Sharma | H04L 43/026 |
| 2019/0075133 A1* | 3/2019 | Chen | H04L 63/20 |
| 2019/0319918 A1* | 10/2019 | Wing | H04L 63/0428 |
| 2020/0252291 A1* | 8/2020 | Mittal | H04L 41/5077 |

* cited by examiner

METHOD AND SYSTEM FOR OPTIMIZING SERVICE DEVICE TRAFFIC MANAGEMENT

CROSS-REFERENCE TO RELATED APPLICATIONS

This application claims priority under 35 U.S.C. § 119(e) to U.S. Provisional Patent Application No. 62/800,228, filed Feb. 1, 2019, which is incorporated herein by reference in its entirety.

BACKGROUND

In information technology (IT) networks, service devices, such as firewalls, may be distributed throughout a network and often provide crucial traffic management and/or access services.

SUMMARY

In general, in one aspect, the invention relates to a method for managing a network device fabric. The method includes obtaining, from a service device, a first service device policy, examining the first service device to identify a first set of qualifiers, performing a first lookup on a group assignment table using the first set of qualifiers, to identify a first set of groups, deriving, from the first service device policy, a first network device redirect rule including the first set of groups, deriving, from the first network device redirect rule, a first modified network device redirect rule set, and making a first attempt at a fabric-wide deployment of the first modified network device redirect rule set, wherein, based on a success of the first attempt, enforcement of the first service device policy is offloaded onto the network device fabric.

In general, in one aspect, the invention relates to a system. The system includes a network device fabric including a plurality of interconnected network devices, a service device directly-connected to a network device of the network device fabric, and a control plane service (CPS) operatively connected to the network device fabric, and programmed to obtain, from the service device, a service device policy, examine the service device to identify a set of qualifiers, perform a lookup on a group assignment table using the set of qualifiers, to identify a set of groups, derive, from the service device policy, a network device redirect rule including the set of groups, derive, from the network device redirect rule, a modified network device redirect rule set, and make an attempt at a fabric-wide deployment of the modified network device redirect rule set, wherein, based on a success of the attempt, enforcement of the service device policy is offloaded onto the network device fabric.

In general, in one aspect, the invention relates to a non-transitory computer readable medium (CRM) including computer readable program code, which when executed by a computer processor, enables the computer processor to obtain, from a service device, a service device policy, examine the service device to identify a set of qualifiers, perform a lookup on a group assignment table using the set of qualifiers, to identify a set of groups, derive, from the service device policy, a network device redirect rule including the set of groups, derive, from the network device redirect rule, a modified network device redirect rule set, and make an attempt at a fabric-wide deployment of the modified network device redirect rule set, wherein, based on a success of the attempt, enforcement of the service device policy is offloaded onto a network device fabric.

Other aspects of the invention will be apparent from the following description and the appended claims.

DETAILED DESCRIPTION

Figure 1:
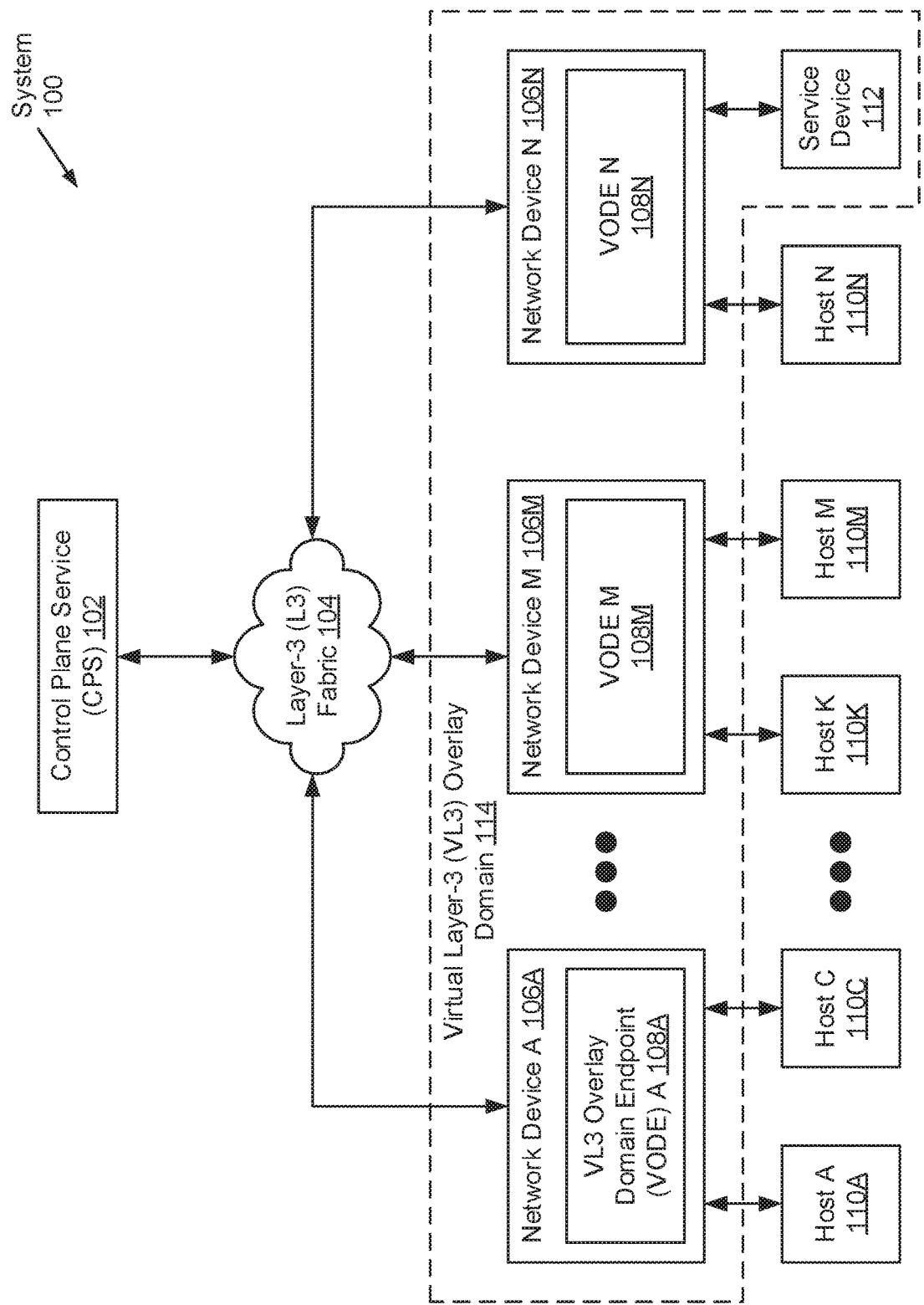
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and system for optimizing service device traffic management. Specifically, one or more embodiments of the invention entail filtering network traffic flows directed to service devices, distributed throughout a network, for inspection. Through the aforementioned filtering, a targeted subset of network traffic flows may be identified and excluded from service device processing. The filtering thus alleviates traffic congestion and improves traffic throughput at the service device(s), thereby optimizing the management and/or processing of network traffic flows redirected to the service device(s).

FIG. 1 shows a system in accordance with one or more embodiments of the invention. The system (100) may include multiple network devices (106A-106N) operatively connected to one another and a control plane service (CPS) (102) through a layer-3 (L3) fabric (104). Further, each network device (106A-106N) may be directly-connected to one or more hosts (110A-110N). Moreover, the system (100) may include one or more service devices (112), which may be directly connected to a subset of the network devices (106A-106N). Each of these components is described below.

In one embodiment of the invention, a network device (106A-106N) may represent a physical computing system that includes persistent storage, memory (e.g., random access memory (RAM), shared memory, etc.), one or more computer processors (e.g., integrated circuits) (including a switch chip or network processor), and two or more physical network interfaces (also referred to as ports). The computer processor(s) may be programmed to determine out of which network interface on the network device (106A-106N) to forward network traffic (e.g., media access control (MAC) frames). To that end, the computer processor(s) may include logical egress and ingress network interfaces that may connect to physical network interfaces on the network device (106A-106N). Further, each physical network device (106A-106N) may or may not be connected, through a physical medium (e.g., Ethernet cable, wire, etc.), to another system (100) component (e.g., a host (110A-110N), another network device (106A-106N), a service device (112), or the L3 fabric (104)).

In one embodiment of the invention, a network device (106A-106N) may include functionality to receive network traffic through a physical network interface, and determine whether to: (i) drop the network traffic; (ii) process the network traffic in accordance with installed device configurations; and/or (iii) send the network traffic, based on the processing, out another physical network interface towards a destination. Furthermore, the various network devices (106A-106N) interconnected throughout the system (100) may collectively be referred to as the network device (or switch) fabric (not shown).

In one embodiment of the invention, how the network device (106A-106N) makes a determination of whether to drop network traffic or send network traffic to another system (100) component, depends, in part, on whether the network device (106A-106N) operates as a layer-2 (L2) switch or a L3 switch (also referred to as a multilayer switch), which may perform at least some functions of a router. If the network device (106A-106N) is operating as a L2 switch, the network device (106A-106N) may use a destination MAC address along with a forwarding table or policy to determine out of which physical network interface to send the network traffic. If the network device (106A-106N) is operating as a L3 switch, the network device (106A-106N) may use a destination Internet Protocol (IP) address along with a routing table or policy to determine out of which physical network interface to send the network traffic. As a L3 switch, the network device (106A-106N) may also include functionality to write the MAC address of the next hop (or component) to receive the network traffic in place of its own MAC address (which the last hop or component to send the network traffic wrote) in the L2 information encapsulating the network traffic. If the network device (106A 106N) is operating as a multilayer switch, the network device (106A-106N) may include functionality to process network traffic using both MAC addresses and IP addresses.

Figure 5:
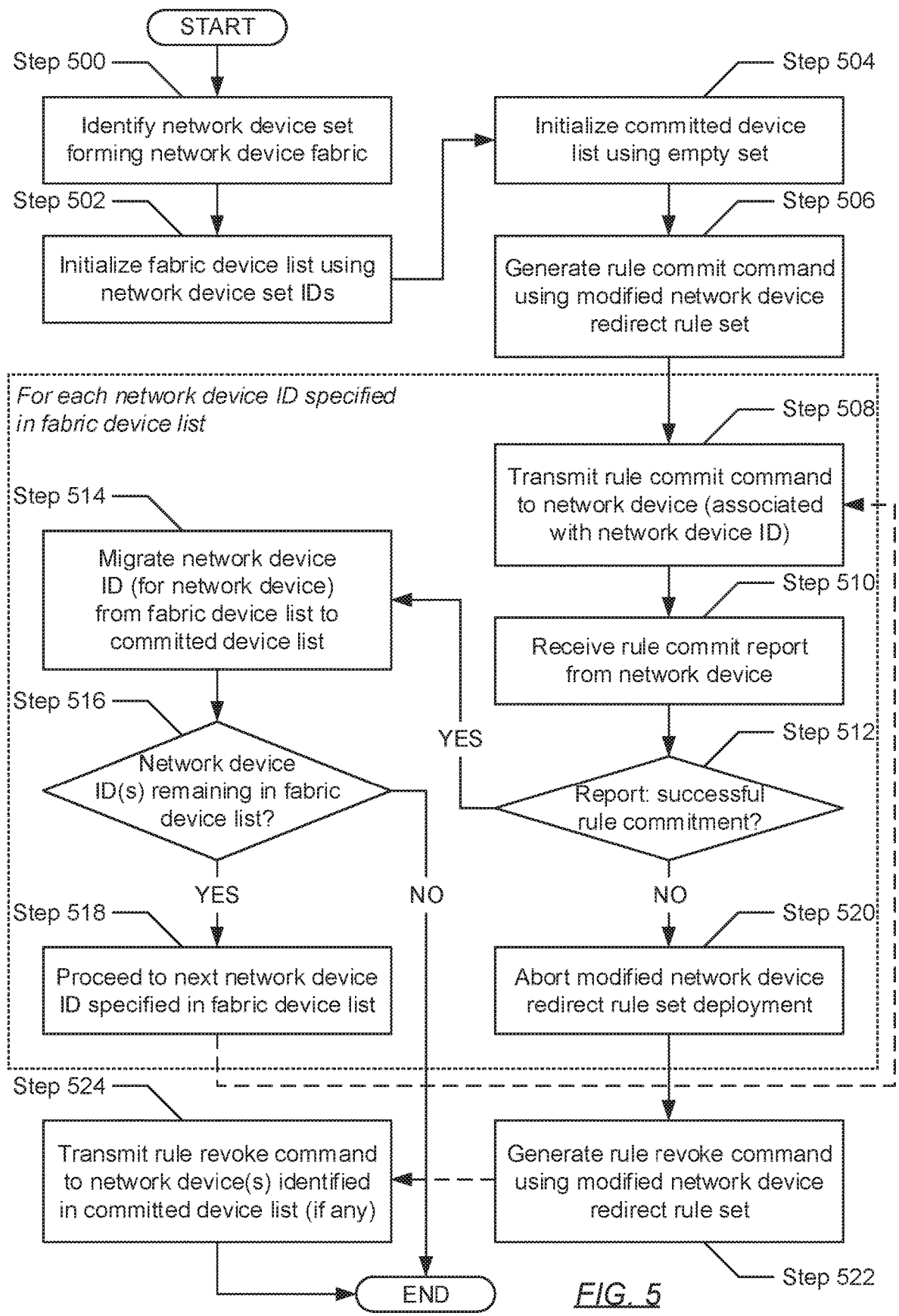
FIG. 5 shows a flowchart describing a method for consistently enforcing a modified network device redirect rule set in accordance with one or more embodiments of the invention.

In one embodiment of the invention, the persistent storage on a network device (106A-106N) may include any type of non-transitory computer readable medium that includes instructions (or computer readable program code), which when executed by the computer processor(s), enable the network device (106A-106N) to perform any of the functionalities described herein (see e.g., FIG. 5). Moreover, examples of a network device (106A-106N) may include, but are not limited to, a switch, a router, and a multilayer switch. Further, a network device (106A-106N) is not limited to the aforementioned specific examples.

In one embodiment of the invention, a network device (106A-106N) may include a virtual layer-3 (VL3) overlay domain endpoint (VODE) (108A-108N) executing thereon. A VODE (108A-108N) may refer to a logical intelligence (i.e., software) that may be tasked with originating and/or terminating virtual layer-3 (VL3) overlay domain tunnels (e.g., virtual extensible local area network (VXLAN) overlay domain tunnels, multi-protocol label switching (MPLS) overlay domain tunnels, generic routing encapsulation (GRE) overlay domain tunnels, etc.). Further, a VODE (108A-108N) may include functionality to: (i) encapsulate MAC frames into VL3 frames, where the MAC frames may be generated by or obtained from a directly-connected host (110A-110N), a virtual machine (VM) (not shown) executing on a directly-connected host (110A-110N), and a directly connected service device (112); (ii) transmit VL3 frames towards remote VODEs (108A-108N) executing on remote network devices (106A-106N) through the L3 fabric (104); (iii) receive other VL3 frames from these remote VODEs (108A-108N) via the L3 fabric (104); and (iv) decapsulate (i.e., remove the VL3 frame header information from) these other VL3 frames to obtain other MAC frames therefrom, where the other MAC frames may have been generated by remote hosts (110A-110N), remote VMs (not shown) executing on remote hosts (110A-110N), and remove service devices (112). By way of an example, a VL3 frame may be a VXLAN frame, whereas the virtual tunnel through which VXLAN frames traverse may be a VXLAN tunnel, and the VODE (108A-108N) wherefrom the VXLAN frames depart and/or arrive may be a virtual tunnel end point (VTEP). Embodiments of the invention are not limited to any specific implementation or protocol for generating VL3 frames and/or virtual tunnels.

In one embodiment of the invention, a host (110A-110N) may represent any physical computing system (e.g., implemented through software and computer hardware) that may be configured to generate, send, receive, and/or process requests and replies, either locally or over a network. A host (110A-110N) may include one or more computer processors, memory, and two or more physical network interfaces (also referred to as ports). Further, a host (110A-110N) may include functionality to generate, receive, and/or transmit network traffic (e.g., MAC frames). Examples of a host (110A-110N) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a table computer, or any other mobile device), or any other type of computing system that includes at least the aforementioned minimum requirements.

In one embodiment of the invention, the CPS (102) may represent a platform for the centralized management of and/or consolidation of state information for all or a portion of the network devices (106A-106N) in the system (100). The CPS (102) may be implemented on one or more physical or virtual devices, which may include at least one or more processors, memory, two or more physical network interfaces (also referred to as ports), and a data repository. In one embodiment of the invention, the CPS (102) may further include executable instructions (or computer readable program code) that may be stored in non-transitory computer readable media, which when executed, enable the CPS (102) to perform any of the functionalities described herein (see e.g., FIGS. 3A-4).

In one embodiment of the invention, the CPS (102) may include a data repository (not shown). The data repository may be a storage system or media for consolidating various forms of data. The data repository may be implemented across on or more physical and/or virtual storage units or devices, which may or may not be of the same type or co-located in a same computing device. Furthermore, the information consolidated in the data repository may be arranged using any storage mechanism (e.g., a filesystem, a database, a collection of tables or records, etc.). In one embodiment of the invention, the data repository may be implemented using persistent (i.e., non-volatile) storage. Examples of persistent storage may include, but are not limited to, optical storage, magnetic storage, NAND Flash Memory, NOR Flash Memory, Magnetic RAM (M-RAM), Spin Torque Magnetic RAM (ST-MRAM), Phase Change Memory (PCM), or any other data storage defined as non-volatile Storage Class Memory (SCM).

In one embodiment of the invention, a service device (112) may represent a physical or virtual computing system that includes functionality to provide a service to one or more network devices (106A-106N) and/or one or more hosts (110A-110N). A service device (112) may include at least one or more computer processors, memory, and two or more physical network interfaces (also referred to as ports). Further, a service device (112) may include functionality to process network traffic, redirected thereto from various VODEs (108A-108N), in accordance with the configuration of, and the specific service thus provided by, the service device (112). Subsequently, a service device (112) may include functionality to filter, mirror, store, forward, drop, transform, and/or perform any other action, or any combination thereof, to redirected network traffic, which may be afforded by the configuration and provided service of the service device (112). Examples of a service device (112) may include, but are not limited to, a network security device (e.g., a firewall device or a denial of service (DOS) attack scrubber), a network filtering device (e.g., a web content filter), a network data cache (e.g., a web-cache device), and a network load balancing device. Moreover, in one embodiment of the invention, a service device (112) may be reachable by (or operatively connected to) any VODE (108A-108N) in the system (100) through a virtual layer-3 (VL3) overlay domain (114). By way of an example, the VL3 overlay domain (114) may be a VXLAN overlay domain.

In one embodiment of the invention, the L3 fabric (104) may represent a set of interconnected network devices or systems, which operatively connect one or more CPSs (102) to each of the network devices (106A-106N) of the system (100). The L3 fabric (104) may include functionality to facilitate communications between these aforementioned components. Accordingly, the L3 fabric (104) may include any combination of local area network (LAN) and/or wide area network (WAN) (e.g., Internet) segments, which may employ any combination of wired and/or wireless connections and communication protocols.

While FIG. 1 shows a configuration of components, other system configurations may be used without departing from the scope of the invention. For example, the system (100) may further include one or more virtual machines (not shown), which may execute on any underlying hardware component portrayed in the system (100).

Figure 2A:
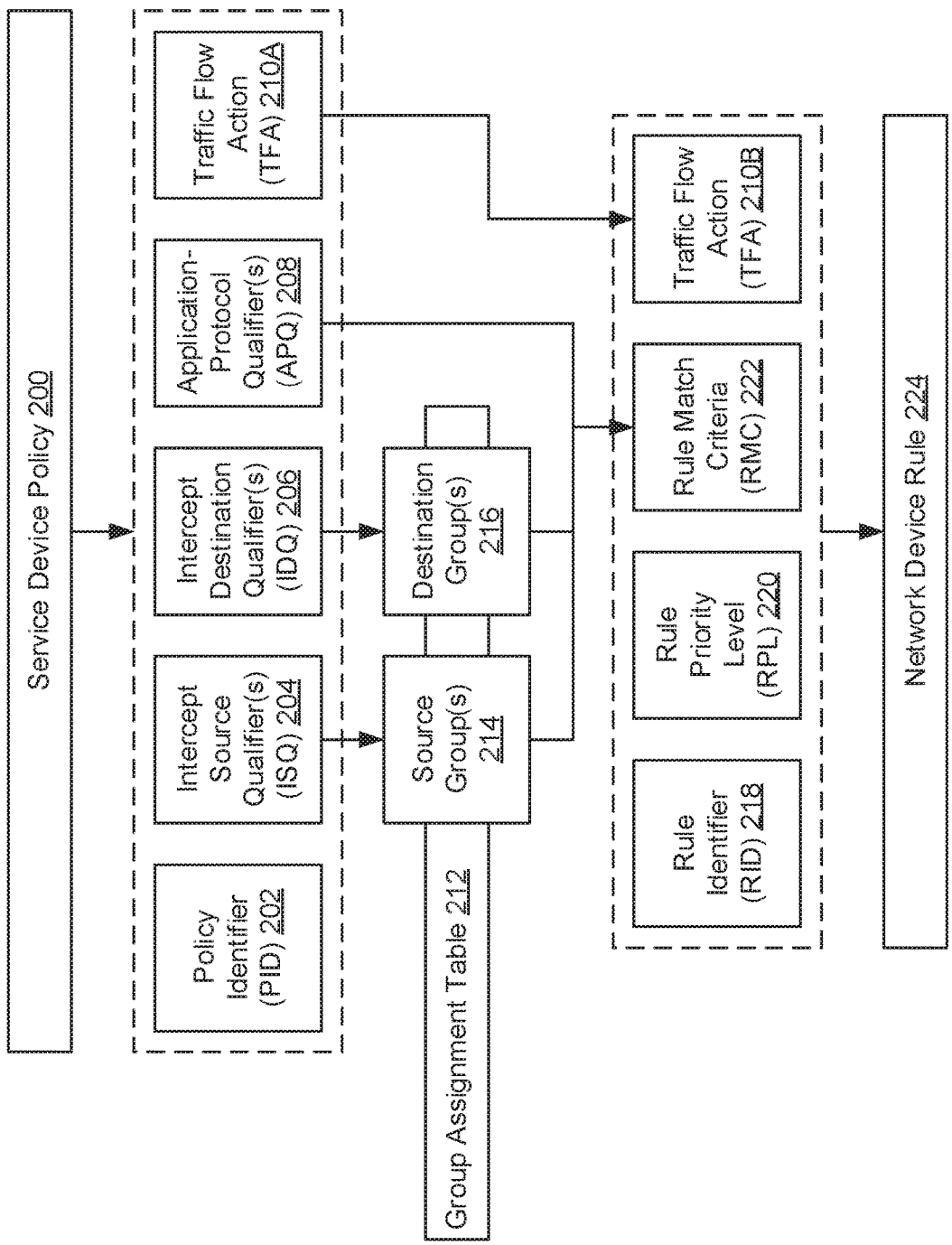
FIG. 2A shows associations between a service device policy and a network device rule in accordance with one or more embodiments of the invention.

FIG. 2A shows associations between a service device policy and a network device rule in accordance with one or more embodiments of the invention. A service device policy (200) may represent a traffic management and/or access rule, followed by a service device (see e.g., FIG. 1), for processing certain network traffic flows. The affected network traffic flows may be defined based on one or more qualifiers. Accordingly, a service device policy (200) may specify a policy identifier (PID) (202), zero or more intercept source qualifiers (ISQ) (204), zero or more intercept destination qualifiers (IDQ) (206), zero or more application-protocol qualifiers (APQ) (208), and one or more traffic flow actions (TFA) (210A). Each of these service device policy (200) components is described below.

In one embodiment of the invention, the PID (202) may represent any arbitrary-length character string used to uniquely identify the service device policy (200). For example, the PID (202) may be expressed as an alphanumeric string including one or more letters and/or numbers.

In one embodiment of the invention, an ISQ (204) (if any are specified) may represent a meta-datum (or a combination of metadata) associated with an origination end point of an intercept network traffic flow. The aforementioned origination end point may refer to a physical or virtual intercept network traffic flow source—e.g., a host (see e.g., FIG. 1) or a virtual machine wherefrom network traffic, sought for interception and inspection by a service device, had been generated. By way of examples, an ISQ (204) may include layer-2 (L2) information, layer-3 (L3) information, layer-4 (L4) information, other information, or any combination thereof, associated with an intercept network traffic flow origination end point. The aforementioned assortment of information is described in further detail below with respect to FIG. 2B.

In one embodiment of the invention, an IDQ (206) (if any are specified) may represent a meta-datum (or a combination of metadata) associated with a termination end point of an intercept network traffic flow. The aforementioned termination end point may refer to a physical or virtual intercept network traffic flow destination—e.g., a host (see e.g., FIG.

1) or a virtual machine whereto network traffic, sought for interception and inspection by a service device, had been addressed. By way of examples, an IDQ (206) may include L2 information, L3 information, L4 information, other information, or any combination thereof, associated with an intercept network traffic flow termination end point. The aforementioned assortment of information is described in further detail below with respect to FIG. 2B.

In one embodiment of the invention, the aforementioned intercept network traffic flow may pertain to any single transmission of one or more protocol data units (PDUs) (e.g., Ethernet media access control (MAC) frames, Internet Protocol (IP) packets, etc.) that may be sought for interception and inspection by a service device. Further, any given intercept network traffic flow may be intercepted at the network device directly-connected to the origination end point, and subsequently, rather than being forwarded to the termination end point, the given intercept network traffic flow may be redirected to a service device for inspection.

In one embodiment of the invention, an APQ (208) (if any are specified) may represent a meta-datum (or a combination of metadata) associated with a particular application and/or protocol pertinent to an intercept network traffic flow. The aforementioned application may refer to a sender or receiver computer program (executing on an origination or termination end point (described above)) of PDU payload(s) encapsulated in the intercept network traffic flow. On the other hand, the aforementioned protocol may refer to a set of rules or procedures by which the intercept network traffic flow is communicated between the origination and termination end points. By way of examples, an APQ (208) may include an application identifier uniquely identifying an application (e.g., an e-mail computer program, a database computer program, etc.) pertinent to the intercept network traffic flow, a protocol identifier uniquely identifying a protocol (e.g., Transmission Control Protocol (TCP), User Datagram Protocol (UDP), Hypertext Transfer Protocol (HTTP), etc.) used in the communication of the intercept network traffic flow, or a combination thereof.

In one embodiment of the invention, a TFA (210A) may represent a given action applied to network traffic flows satisfying or matching the various qualifiers (e.g., ISQ (204), IDQ (206), and/or APQ (208)) definitive of the service device policy (200). For example, if the TFA (210A) specifies a PERMIT action, then any network traffic flow(s), matching the qualifier(s) of the service device policy (200), may be permitted to proceed towards their respective destination(s)—i.e., termination end point(s) (described above). By way of another example, if the TFA (210A) specifies a DENY action, then any network traffic flow(s), matching the qualifier(s) of the service device policy (200), may be dropped or discarded. The TFA (210A) may not be limited to these aforementioned actions. In fact, the TFA (210A) may specify other actions, relevant to the configuration of and/or the services provided by the service device (see e.g., FIG. 1) with which the service device policy (200) may be associated, without departing from the scope of the invention.

In one embodiment of the invention, a network device rule (224) may represent a traffic management and/or access rule, followed by a network device (see e.g., FIG. 1), for processing certain network traffic flows, which may or may not be redirected to a service device for further inspection. The affected network flows may be defined based on information matching (described below). Accordingly, a network device rule (224) may specify a rule identifier (RID) (218), a rule priority level (RPL) (220), rule match criteria (RMC) (222), and one or more TFAs (210). Each of these network device rule (224) components is described below.

In one embodiment of the invention, the RID (218) may represent any arbitrary-length character string used to uniquely identify the network device rule (224). For example, the RID (218) may be expressed using an alpha-numeric string including one or more letters and/or numbers.

In one embodiment of the invention, the RPL (220) may refer to a numeric (e.g., 0 to 10) or categorical value (e.g., 'low', 'medium', 'high') that reflects the relative importance of the network device rule (224) compared to other network device rules (not shown). The RPL (220) may be used to select which network device rule (224) to apply should multiple network device rules match with the lookup key utilized during a lookup of the lookup table. By way of an example, the lookup table may refer to ternary content addressable memory (TCAM) residing on a network device.

In one embodiment of the invention, the RMC (222) may represent characteristic information that defines a certain network traffic flow to which the network device rule (224) applies. Specifically, the aforementioned characteristic information may refer to a meta-datum (or a combination of metadata) pertinent to the certain network traffic flow, which may be derived from any subset or all of the following: (a) the ISQ (204); (b) the IDQ (206); and/or (c) the APQ (208), specified in a relevant service device policy (200) (described above). With respect to the ISQ (204) and IDQ (206), which pertain to the origination and termination end points, respectively, of an intercept network traffic flow, the RMC (222) may reflect their contribution to characteristic information through respective groups into which the ISQ (204) and IDQ (206) may be classified. Accordingly, by way of a group assignment table (212) (see e.g., FIG. 2B), the ISQ (204) may be classified or mapped into one or more source groups (214), whereas the IDQ (206) may be classified or mapped into one or more destination groups (216). Subsequently, a source group (214) may refer to a classification assigned to the origination end point of the certain network traffic flow to which the network device rule (224) applies. Meanwhile, a destination group (216) may refer to a classification assigned to the termination end point of the certain network traffic flow to which the network device rule (224) applies.

In one embodiment of the invention, a TFA (210B) may represent a given action applied to network traffic flows satisfying or matching the RMC (222). For example, if the TFA (210B) specifies a PERMIT action, then any network traffic flow(s), matching the RMC (220) of the network device rule (224), may be permitted to proceed towards their respective destination(s)—i.e., termination end point(s) (described above). By way of another example, if the TFA (210B) specifies a DROP or DENY action, then any network traffic flow(s), matching the RMC (222) of the network device rule (224), may be dropped or discarded accordingly. By way of yet another example, if the TFA (210B) specifies a REDIRECT or NEXTHOP action, then any network traffic flow(s), matching the RMC (222) of the network device rule (224), may be redirected to a specified service device for inspection or a next hop. The TFA (210B) may not be limited to these aforementioned actions. That is, the TFA (210B) may specify other actions without departing from the scope of the invention.

In one embodiment of the invention, any given network device rule (224) described hereinafter may identify as: (a) a network device redirect rule; or (b) a modified network device redirect rule. These network device rule (224) sub-classes are described in further detail below with respect to FIG. 2C.

Figure 2B:
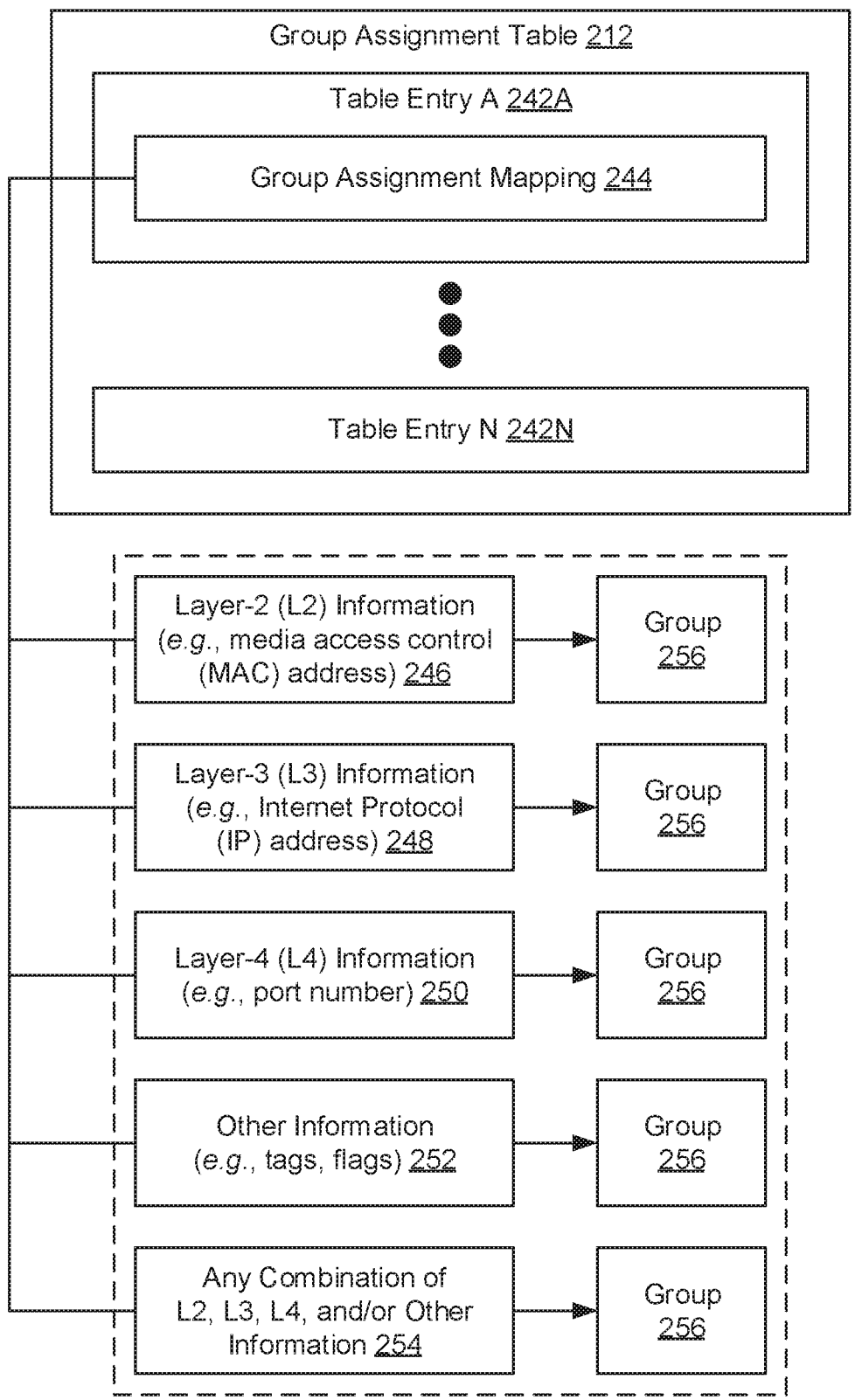
FIG. 2B shows a group assignment table in accordance with one or more embodiments of the invention.

FIG. 2B shows a group assignment table in accordance with one or more embodiments of the invention. The group assignment table (212) may refer to a data object or structure dedicated to storing group assignment mappings (244), which may reside on a control plane service (CPS) and one or more network devices (see e.g., FIG. 1) of a network. Each group assignment mapping (244) may be tracked in the form of a table entry (242A-242N), and may pertain to binding certain network traffic flow metadata to group classifications. Accordingly, each group assignment mapping (244) may map layer-2 (L2) information (246), layer-3 (L3) information (248), layer-4 (L4) information (250), other information (252), or any combination thereof (254), to a group (256). Each of these items is described below.

In one embodiment of the invention, L2 information (246) may refer to data link layer information (or metadata) descriptive of a network traffic flow. Data link layer information may be directed to the local forwarding of protocol data units (PDUs), forming the network traffic flow, between multiple interconnected devices within a local area network (LAN) or a subnet (i.e., subnetwork) of a wide area network (WAN) such as the Internet. Further, the L2 information (246) may or may not be specified within header information of the aforementioned PDU(s). Examples of L2 information (246) may include, but are not limited to, a source media access control (MAC) address associated with an origination end point of the network traffic flow, and a destination MAC address associated with a termination end point of the network traffic flow.

In one embodiment of the invention, L3 information (248) may refer to network layer information (or metadata) descriptive of a network traffic flow. Network layer information may be directed to the inter-network routing of PDUs, forming the network traffic flow, between multiple interconnected LANs or subnets of a WAN such as the Internet. Further, the L3 information (248) may or may not be specified within header information of the aforementioned PDU(s). Examples of L3 information (248) may include, but are not limited to, a source Internet Protocol (IP) address associated with an origination end point of the network traffic flow, a destination IP address associated with a termination end point of the network traffic flow, a source virtual routing and forwarding (VRF) domain associated with the origination end point of the network traffic flow, and a destination VRF domain associated with the termination end point of the network traffic flow.

In one embodiment of the invention, L4 information (250) may refer to transport layer information (or metadata) descriptive of a network traffic flow. Transport layer information may be directed to the delivery of PDUs, forming the network traffic flow, between appropriate applications hosted on interconnected devices throughout a network (e.g., one or more LANs, one or more subnets of a WAN such as the Internet, etc.). Further, the L4 information (250) may or may not be specified within header information of the aforementioned PDU(s). Examples of L4 information (250) may include, but are not limited to, a source network interface (or port) used by an appropriate application executing on an origination end point of the network traffic flow, a destination network interface (or port) used by an appropriate application executing on a termination end point of the network traffic flow, and a byte-length descriptive of a length of the PDU(s) forming the network traffic flow.

In one embodiment of the invention, other information (252) may refer to miscellaneous information (or metadata) descriptive of a network traffic flow. Miscellaneous information may be directed to any information not specifically recognized as L2 information (246), L3 information (248), and/or L4 information (250). Further, the other information (252) may or may not be specified within header information of one or more PDUs, which may form the network traffic flow. Examples of other information (252) may include, but are not limited to, a source virtual local area network (VLAN) tag for a source VLAN associated with an origination end point of the network traffic flow, a destination VLAN tag for a destination VLAN associated with a termination end point of the network traffic flow, a type of service (or service precedence) associated with the network traffic flow, and a protocol used in the encapsulation of the data payload of the PDU(s) forming the network traffic flow.

In one embodiment of the invention, combination information (254) may refer to any arrangement of L2 information (246), L3 information (248), L4 information (250), and/or other information (252) (or metadata) descriptive of a network traffic flow. Combination information (254) may entail multiple pieces of information pertaining to a single information class—e.g., multiple pieces of information classified as L2 information (246). Alternatively, combination information (254) may entail multiple pieces of information that collectively span across multiple information classes—e.g., a first piece of information classified as L2 information (246), second and third pieces of information classified as L3 information (248), as well as a fourth piece of information classified as other information (252).

In one embodiment of the invention, a group (256) may represent a classification used to compress a list of metadata, descriptive of or pertinent to one or more network traffic flows, into a single, referenceable entity. The compression of multiple network traffic flow metadata, into far fewer groups (256), may result in the commitment or accommodation of far fewer network device rules into limited space lookup tables residing on network devices. Characterized through the incorporation of one or more groups (256) to replace and represent a potentially greater cardinality of network traffic flow metadata (as the specified rule match criteria (RMC) (see e.g., FIG. 2A)), each of the aforementioned far fewer network device rules may also be referred to herein as a group-referenced network device rule. In contrast, network device rules that refrain from the incorporation of groups (256) and, subsequently, retain the specification of separate network traffic flow meta-datum (or any combination of traffic flow metadata) to define their respective RMCs, may also be referred to herein as metadata-referenced network device rules.

In one embodiment of the invention, each group-referenced network device rule may substitute, and account for, multiple metadata-referenced network device rules. That is, because a given group (256) may compress any arbitrary-cardinality list of network traffic flow metadata, a group-referenced network device rule incorporating the given group (256) may subsume multiple metadata-referenced network device rules, where each metadata-referenced network device rule may have incorporated one meta-datum (or a subset of metadata) that which the given group (256) compresses. In view of the aforementioned, utilization of the limited, allocated space, definitive of lookup tables on network devices, may be optimized when the deployment and commitment of group-referenced network device rules, versus metadata-referenced network device rules, are considered.

Figure 2C:
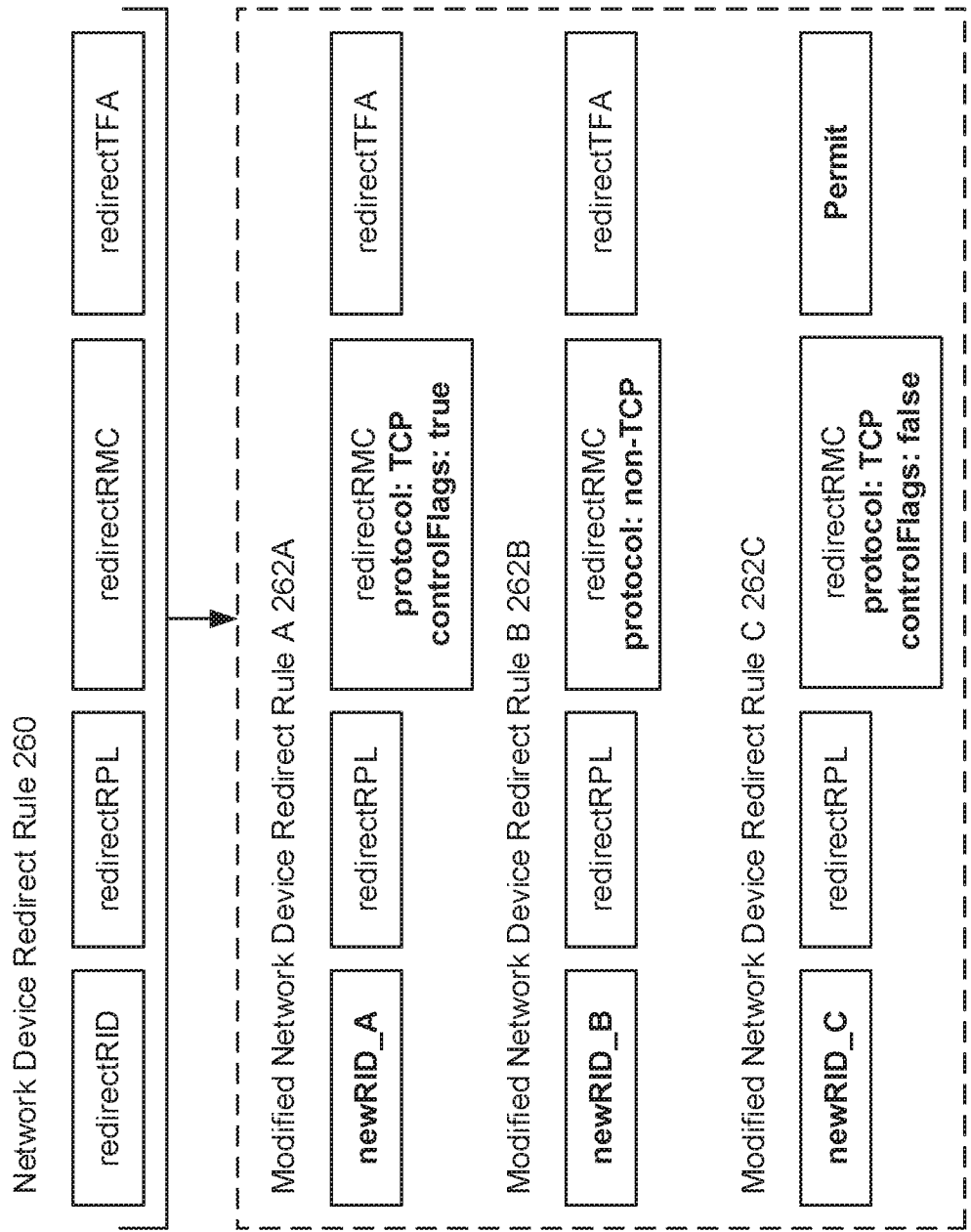
FIG. 2C shows derivations of modified network device redirect rules from a network device redirect rule in accordance with one or more embodiments of the invention.

FIG. 2C shows derivations of modified network device redirect rules from a network device redirect rule in accordance with one or more embodiments of the invention. A network device redirect rule (260) may represent a network device rule subclass directed to the redirection (or detour) of network traffic flows to alternative destinations not representative of their respective original termination end points (described above). For example, a network device redirect rule (260) may match to, and subsequently, intercept and redirect certain network traffic flows to a service device for inspection. Network traffic flows redirected to a service device may also be referred to herein as intercept network traffic flows. By way of another example, a network device redirect rule (260) may match to, and subsequently, intercept and redirect certain other network traffic flows to another specified next hop (e.g., another network device or host). The redirection characteristic of a network device redirect rule (260) may be exhibited in its respective traffic flow action (TFA) (see e.g., FIG. 2A)—e.g., "redirectTFA". Particularly, the TFA of the network device redirect rule (260) may specify a REDIRECT or NEXTHOP action, which redirects matching network traffic flows to a specified service device for inspection or a specified next hop.

In one embodiment of the invention, one or more modified network device redirect rules (262A, 262B, 262C) may be derived from a given network device redirect rule (260). Each modified network device redirect rule (262A, 262B, 262C) at least incorporates additional RMC—e.g., one or more additional qualifiers—which enables the management of more targeted or specific network traffic flows. Specifically, the modified network device redirect rule(s) may be generated in order to target and manage a specific subset of intercept network traffic flows (described above) that would have been intercepted, and subsequently, redirected or rerouted to a service device. The aforementioned additional or supplemental RMC may also be referred to herein as a filtering qualifier set (FQS). By way of non-limiting examples, three modified network device redirect rules (262A, 262B, 262C) are portrayed in FIG. 2C. Each of these modified network device redirect rules (262A, 262B, 262C) and their distinguishing characteristics are described below.

In one embodiment of the invention, the first modified network device redirect rule (262A) may target intercept network traffic flows that may specifically be communicated using the transmission control protocol (TCP) and encompasses one or more protocol data units (PDUs) representative of a control PDU type. Accordingly, the first modified network device redirect rule (262A) may include or specify a first modified RMC derived from incorporating a first FQS into the RMC (associated with the parent network device redirect rule (260)). The first FQS may include or specify an application-protocol qualifier (APQ) (see e.g., FIG. 2A) and a protocol-control qualifier (PCQ). The APQ may represent a meta-datum associated with a particular application and/or protocol pertinent to an intercept network traffic flow. The aforementioned protocol may refer to a set of rules or procedures by which the intercept network traffic flow is communicated between the origination and termination end points. In the presented non-limiting example, the first FQS may include an APQ that specifies the transmission control protocol (TCP), which may be used to isolate or target intercept network traffic flows that are communicated using the TCP.

On the other hand, in one embodiment of the invention, the PCQ may represent a meta-datum reflecting a PDU type associated with the one or more PDUs representative of an intercept network traffic flow. The aforementioned PDU type may reflect whether the PDU(s) of the intercept network traffic flow is/are directed to a control PDU type. Accordingly, the PCQ may reflect at least two possible states: (a) a TRUE state, indicative that the PDU(s) of the intercept network traffic flow is/are directed to a control PDU type; or (b) a FALSE state, indicative that the PDU(s) of the intercept network traffic flow is/are not directed to a control PDU type. Furthermore, a given PDU may be directed to a control PDU type if one or more control flags, specified in the given PDU, is/are enabled—e.g., reflects an ENABLED or TRUE state. In the presented non-limiting example, the first FQS may include a PDQ that reflects the TRUE state, which may be used to isolate or target intercept network traffic flows that include control PDU type PDUs.

In one embodiment of the invention, the control flag(s), when enabled, may indicate the current connection state of a sought or established connection between the origination and termination end points. The sought or established connection may be facilitated through the protocol specified in the above-mentioned APQ. For example, with regards to the TCP, any given TCP-communicated PDU may specify various control flags, which are used for troubleshooting purposes or to control the handling of an associated connection. Should any of these various control flags be enabled, the given TCP-communicated PDU may be identified as a control PDU type and, subsequently, the PCQ may reflect the TRUE state. These various control flags may include, but are not limited to: (a) a synchronization (SYN) control flag, which when enabled, indicates that the establishment of a connection to the termination end point is being sought (or requested) by the origination end point; (b) an acknowledgement (ACK) control flag, which when enabled, indicates that network traffic flows from one end point to the other, and/or vice versa, has been successfully received by the opposing end point; (c) a finish (FIN) control flag, which when enabled, indicates that the graceful termination of an established connection between the origination and termination end points is being sought (or requested); and (d) a reset (RST) control flag, which when enabled, indicates that the abrupt termination of an established connection between the origination and termination end points is being sought (or requested) (i.e., usually performed when something is wrong with the established connection).

In one embodiment of the invention, the first modified network device redirect rule (262A) may subsequently be constructed, and thus may specify, a first new rule identifier (RID), the rule priority level (RPL) and TFA associated with the parent network device redirect rule (260), and the first modified RMC (described above). The first new RID may or may not derive from (or be created based on) the RID specified in the parent network device redirect rule (260).

In one embodiment of the invention, the second modified network device redirect rule (262B) may target intercept network traffic flows that may specifically be communicated using protocols other than the TCP. Accordingly, the second modified network device redirect rule (262B) may include or specify a second modified RMC derived from incorporating a second FQS into the RMC (associated with the parent network device redirect rule (260)). The second FQS may include or specify an APQ (see e.g., FIG. 2A). The APQ may represent a meta-datum associated with a particular application and/or protocol pertinent to an intercept network traffic flow. The aforementioned protocol may refer to a set of rules or procedures by which the intercept network traffic flow is communicated between the origination and termination end points. In the presented non-limiting example, the second FQS may include an APQ that specifies any non-TCP protocols—e.g., User Datagram Protocol (UDP), Hypertext Transfer Protocol (HTTP), etc.—which may be used to isolate or target intercept network traffic flows that are communicated using non-TCP protocols.

In one embodiment of the invention, the second modified network device redirect rule (262B) may subsequently be constructed, and thus may specify, a second new RID, the RPL and TFA associated with the parent network device redirect rule (260), and the second modified RMC (described above). The second new RID may or may not derive from (or be created based on) the RID specified in the parent network device redirect rule (260).

In one embodiment of the invention, the third modified network device redirect rule (262C) may target intercept network traffic flows that may specifically be communicated using the TCP and encompasses one or more PDUs representative of a control PDU type. Accordingly, the third modified network device redirect rule (262C) may include or specify a third modified RMC derived from incorporating a third FQS into the RMC (associated with the parent network device redirect rule (260)). The third FQS may include or specify and APQ (see e.g., FIG. 2A) and a PCQ. In the presented non-limiting example, the third FQS may include an APQ that specifies the TCP, which may be used to isolate or target intercept network traffic flows that are communicated using the TCP. Furthermore, in the presented non-limiting example, the third FQS may include a PCQ that reflects a FALSE state, which may be used to isolate or target intercept network traffic flows that exclude control PDU type PDUs (described above).

In one embodiment of the invention, the third modified network device redirect rule (262C) may subsequently be constructed, and thus may specify, a third new RID, the RPL associated with the parent network device redirect rule (260), the third modified RMC (described above), and a new TFA. The third new RID may or may not derive from (or be created based on) the RID specified in the parent network device redirect rule (260). Further, the new TFA may replace the REDIRECT or NEXTHOP action (associated with the parent network device redirect rule (260)) with a PERMIT action. Subsequently, intercept network traffic flows matching the third modified network device redirect rule (262C) may be permitted to proceed towards their respective destination(s)—i.e., termination end point(s)—rather than being redirected to a specific service device for inspection or a next hop by matching with the parent network device redirect rule (260).

FIGS. 3A-3D show flowcharts describing a method for offloading service device policies in accordance with one or more embodiments of the invention. The various steps outlined below may be performed by the control plane service (CPS) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Figure 3A:
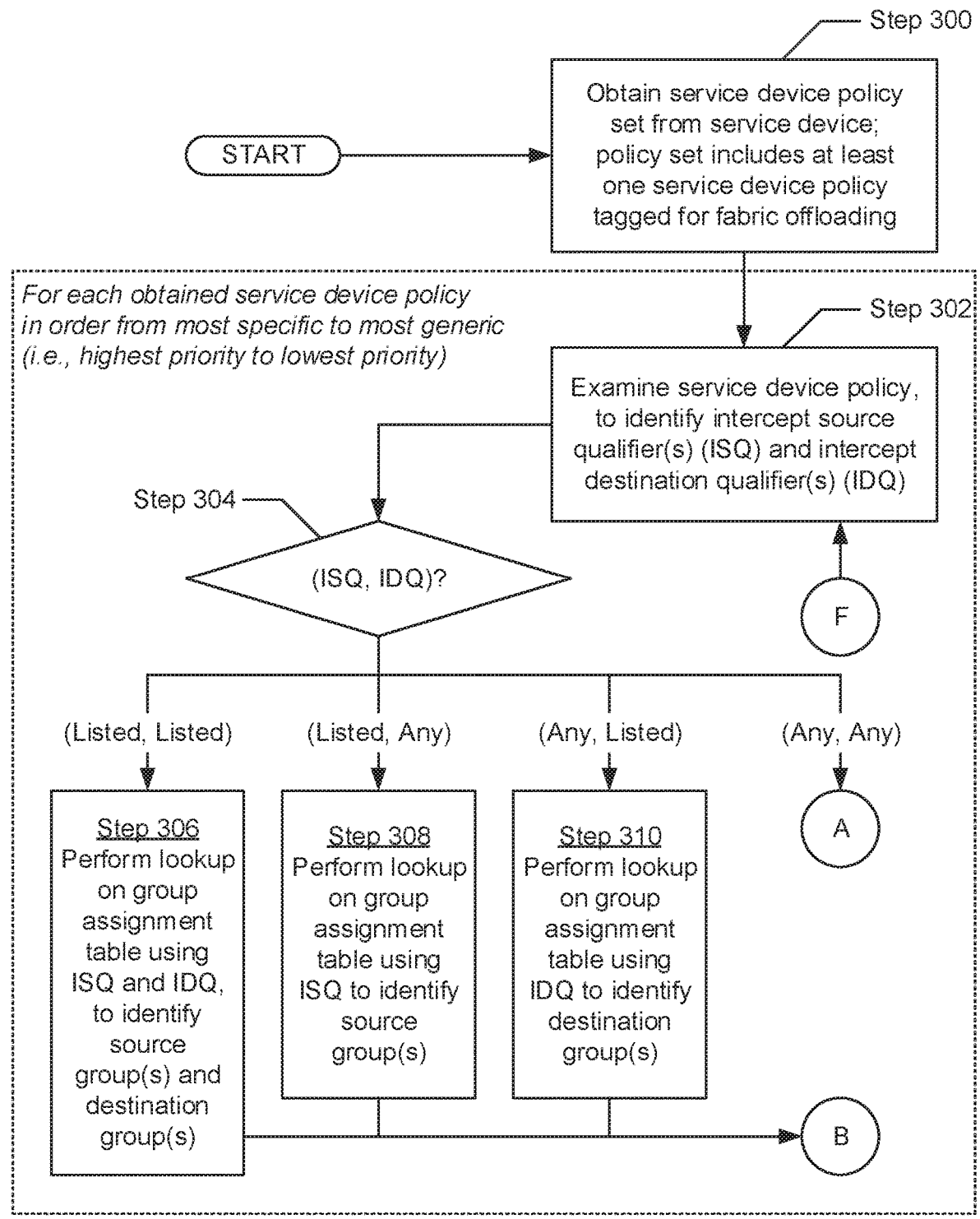
FIGS. 3A-3D show flowcharts describing a method for offloading service device policies in accordance with one or more embodiments of the invention.

Turning to FIG. 3A, in Step 300, a service device policy set is obtained from a service device. In one embodiment of the invention, the service device policy set may include one or more service device policies (see e.g., FIG. 2A) that have been tagged for fabric offloading. A service device policy may represent a traffic management and/or access rule, which may define the functionality of a service device (see e.g., FIG. 1) and may be directed to processing certain network traffic flows. Further, fabric offloading may refer to the re-assignment of enforcement responsibilities, pertinent to one or more traffic management and/or access rules, from the service device to a network device fabric. That is, fabric offloading may entail the translation of any given service device policy, which may have been interpreted and enforced by the service device, to a set of network device rules, which may be interpreted by the network device fabric and, accordingly, allows the network device fabric to assume the enforcement of the relevant traffic management and/or access rule. The network device fabric may refer to the collection of interconnected network devices that form a network. Moreover, the service device policy set may be tagged (or selected) manually by administrators of the network or, alternatively, automatically by an intelligence executing on the service device, which may tag (or select) service device policies for fabric offloading based on various monitored metrics.

Hereinafter, the remaining steps (i.e., Steps 302 through 366) outlined below may be performed for each service device policy (of the service device policy set obtained in Step 300). Further, the order, in which the one or more obtained service device policies may be processed, may be specificity-based. That is, the processing of more specific (or less generic) service device policies may be prioritized over less specific (or more generic) service device policies. In one embodiment of the invention, the specificity of a given service device policy may be determined based on the quantity of qualifiers—e.g., intercept source qualifier(s) (ISQ), intercept destination qualifier(s) (IDQ), and/or application-protocol qualifier(s) (APQ) (see e.g., FIG. 2A)—that may be definitive of the given service device policy. For example, a first service device policy may be more specific (and thus associate with a higher processing priority) than a second service device policy because the number of qualifiers included in, and required to invoke, the first service device policy exceeds the number of qualifiers included in, and required to invoke, the second service device policy. Accordingly, the second service device policy may be more generic (and thus associate with a lower processing priority).

In Step 302, the service device policy (currently being processed) is examined. In one embodiment of the invention, examination of the service device policy may identify the ISQ and IDQ (if any) specified in the service device policy (see e.g., FIG. 2A).

In Step 304, a determination is made as to whether a tuple including respective states for the ISQ and IDQ (identified in Step 302) is one of four possible combinations. The state of the ISQ may be directed to a LISTED state should at least one meta-datum, associated with an origination end point of an intercept network traffic flow, be specified in the service device policy. Similarly, the state of the IDQ may be directed to a LISTED state should at least one meta-datum, associated with a termination end point of the intercept network traffic flow, be specified in the service device policy. Alternatively, the state of the ISQ and/or IDQ may be directed to an ANY state should zero metadata, associated with the origination or termination end points, respectively, be specified in the service device policy.

Accordingly, in one embodiment of the invention, if it is determined that both the ISQ and the IDQ reflect the LISTED state—i.e., (ISQ, IDQ)=(LISTED, LISTED)—then the process proceeds to Step 306. In another embodiment of the invention, if it is alternatively determined that the ISQ reflects the LISTED state while the IDQ reflects the ANY state—i.e., (ISQ, IDQ)=(LISTED, ANY)—then the process alternatively proceeds to Step 308. In yet another embodiment of the invention, if it is alternatively determined that the ISQ reflects the ANY state while the IDQ reflects the LISTED state—i.e., (ISQ, IDQ)=(ANY, LISTED)—then the process alternatively proceeds to Step 310. On the other hand, in yet another embodiment still of the invention, if it is alternatively determined that both the ISQ and the IDQ reflect the ANY state—i.e., (ISQ, IDQ)=(ANY, ANY)—then the process alternatively proceeds to Step 364 (see e.g., FIG. 3D).

In Step 306, after determining (in Step 304) that both the ISQ and the IDQ (identified in Step 302) reflect the LISTED state—i.e., (ISQ, IDQ)=(LISTED, LISTED)—a lookup is performed on a group assignment table (see e.g., FIG. 2B) using the ISQ and the IDQ. Specifically, in one embodiment of the invention, the one or more origination end point metadata, representative of the ISQ, may be compared against various group assignment mappings stored in the group assignment table, to identify one or more source groups. Similarly, the one or more termination end point metadata, representative of the IDQ, may be compared against the various group assignment mappings, to identify one or more destination groups. Hereinafter, the process proceeds to Step 320 (see e.g., FIG. 3B).

In Step 308, after determining (in Step 304) that the ISQ and the IDQ (identified in Step 302) reflect the LISTED and ANY states, respectively—i.e., (ISQ, IDQ)=(LISTED, ANY)—a lookup is performed on a group assignment table (see e.g., FIG. 2B) using the ISQ. Specifically, in one embodiment of the invention, the one or more origination end point metadata, representative of the ISQ, may be compared against various group assignment mappings stored in the group assignment able, to identify one or more source groups. Hereinafter, the process proceeds to Step 322 (see e.g., FIG. 3B).

In Step 310, after determining (in Step 304) that the ISQ and the IDQ (identified in Step 302) reflect the ANY and LISTED states, respectively—i.e., (ISQ, IDQ)=(ANY, LISTED)—a lookup is performed on a group assignment table (see e.g., FIG. 2B) using the IDQ. Specifically, in one embodiment of the invention, the one or more termination end point metadata, representative of the IDQ, may be compared against various group assignment mappings stored in the group assignment table, to identify one or more destination groups. Hereinafter, the process proceeds to Step 324 (see e.g., FIG. 3B).

Figure 3B:
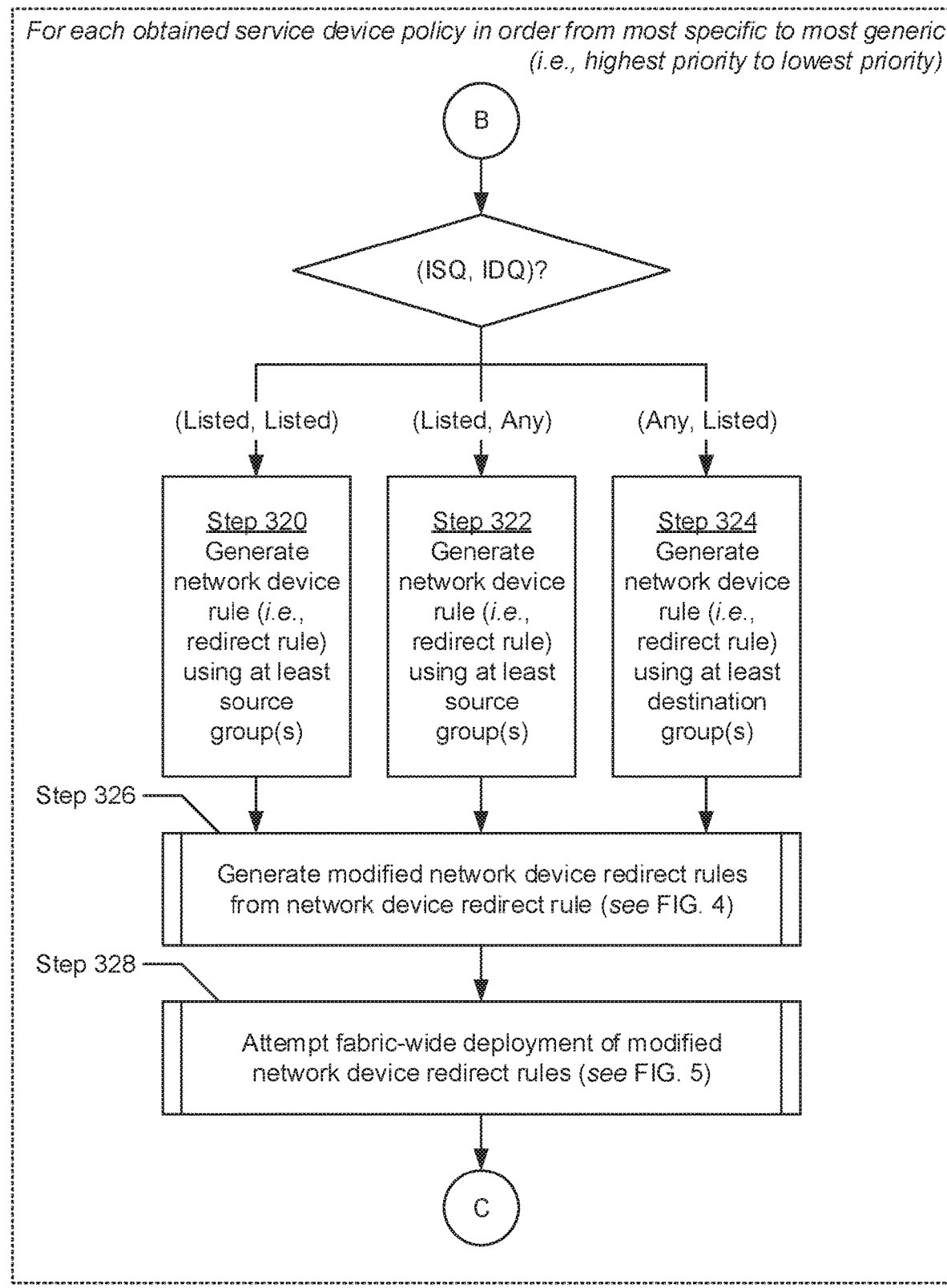

Turning to FIG. 3B, in Step 320, following the identification of one or more source groups and/or destination groups (in Step 306), and based on both the ISQ and the IDQ (identified in Step 302) reflecting the LISTED state—i.e., (ISQ, IDQ)=(LISTED, LISTED)—a network device rule is generated using at least the identified source group(s). In one embodiment of the invention, the generated network device rule may represent a network device redirect rule (see e.g., FIG. 2C). Further, the generated network device rule may incorporate the identified source group(s) as the rule matching criteria (RMC) specified therein (see e.g., FIG. 2A).

In Step 322, following the identification of one or more source groups (in Step 308), and based on the ISQ and the IDQ (identified in Step 302) reflecting the LISTED and ANY states, respectively—i.e., (ISQ, IDQ)=(LISTED, ANY)—a network device rule is generated using at least the identified source group(s). In one embodiment of the invention, the generated network device rule may represent a network device redirect rule (see e.g., FIG. 2C). Further, the generated network device rule may incorporate the identified source group(s) as the RMC specified therein (see e.g., FIG. 2A).

In Step 324, following the identification of one or more destination groups (in Step 310), and based on the ISQ and the IDQ (identified in Step 302) reflecting the ANY and LISTED states, respectively—i.e., (ISQ, IDQ)=(ANY, LISTED)—a network device rule is generated using at least the identified destination group(s). In one embodiment of the invention, the generated network device rule may represent a network device redirect rule (see e.g., FIG. 2C). Further, the generated network device rule may incorporate the identified destination group(s) as the RMC specified therein (see e.g., FIG. 2A).

In Step 326, modified network device redirect rules are generated. Specifically, in one embodiment of the invention, the modified network device redirect rules (see e.g., FIG. 2C) may be derived from the network device rule (i.e., network device redirect rule) (generated in Step 320, Step 322, or Step 324). Generation of the modified network device redirect rules is described in further detail below with respect to FIG. 4.

In Step 328, a fabric-wide deployment of the modified network device redirect rules (generated in Step 326) is attempted. The fabric-wide attempt at deploying the network device rule is described in further detail below with respect to FIG. 5. Hereinafter, the process proceeds to Step 340 (see e.g., FIG. 3C).

Figure 3C:
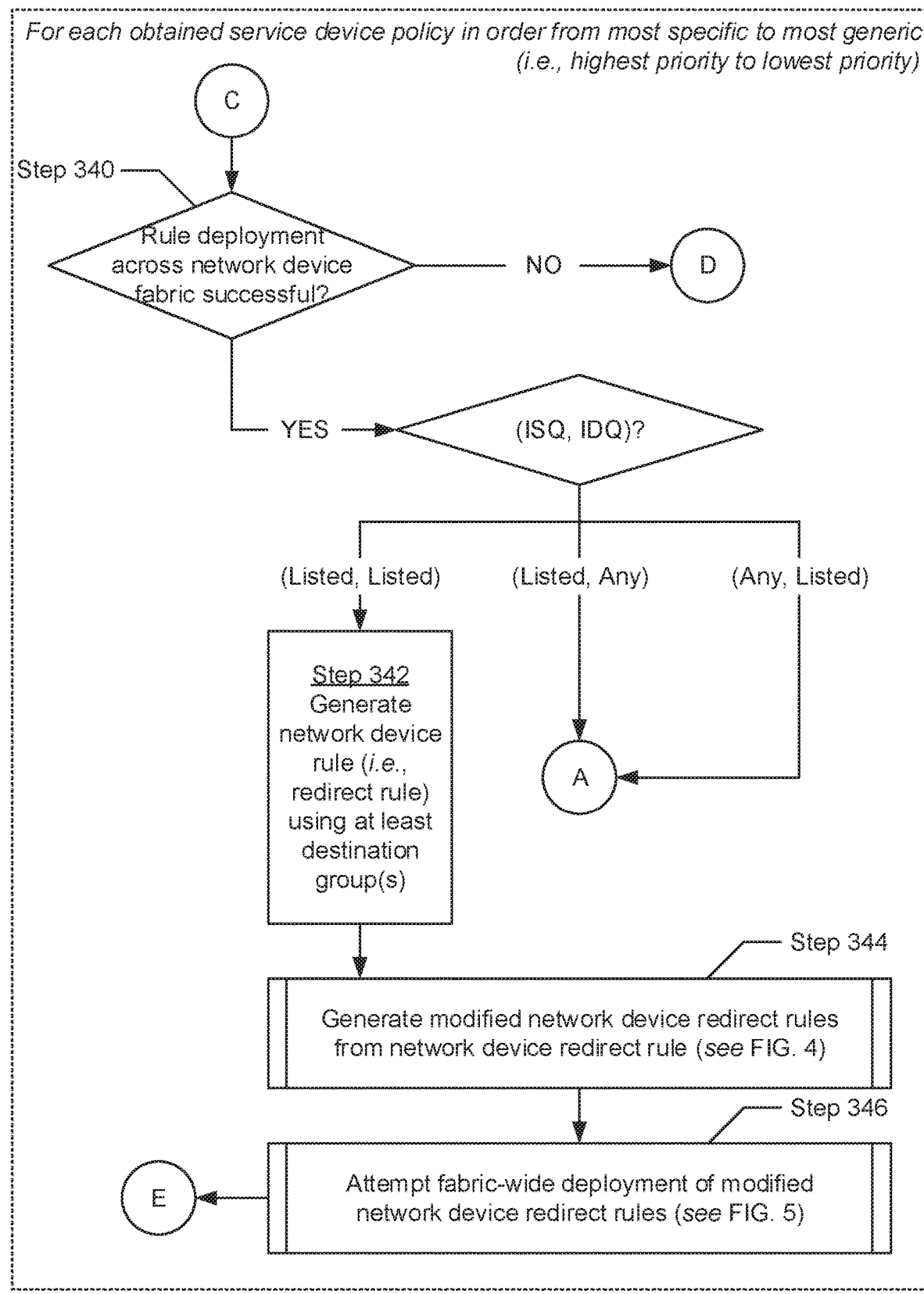

Turning to FIG. 3C, in Step 340, following the attempted fabric-wide deployment (in Step 328) of the modified network device redirect rules (generated in Step 326), a determination is made as to whether the aforementioned fabric-wide deployment attempt had been successful. Success of the fabric-wide deployment attempt may be contingent on a commitment of all the aforementioned modified network device redirect rules on and by all network devices forming the network device fabric (described above). Alternatively, failure of the fabric-wide deployment attempt may reflect that at least one network device, of the network device fabric, was not able to commit at least one of the aforementioned modified network device redirect rules. Accordingly, in one embodiment of the invention, if it is determined that the aforementioned fabric-wide deployment attempt had been a success, then the process proceeds to Step 342 or Step 364 (see e.g., FIG. 3D) (depending on the reflected ISQ and IDQ states (determined in Step 304)). On the other hand, in another embodiment of the invention, if it is alternatively determined that the aforementioned fabric-wide deployment attempt had been a failure, then the process proceeds to Step 362 (see e.g., FIG. 3D).

In Step 342, after determining (in Step 340) that the attempted fabric-wide deployment (in Step 328) of the modified network device redirect rules (generated in Step 326) had been a success, and based on both the ISQ and the IDQ (identified in Step 302) reflecting the LISTED state—i.e., (ISQ, IDQ)=(LISTED, LISTED)—another network device rule is generated using at least the destination group(s) (identified in Step 306). In one embodiment of the invention, the generated network device rule may represent a network device redirect rule (see e.g., FIG. 2C). Further, the generated network device rule may incorporate the identified destination group(s) as the RMC specified therein (see e.g., FIG. 2A).

In Step 344, modified network device redirect rules are generated. Specifically, in one embodiment of the invention, the modified network device redirect rules (see e.g., FIG. 2C) may be derived from the network device rule (i.e., network device redirect rule) (generated in Step 244). Generation of the modified network device redirect rules is described in further detail below with respect to FIG. 4.

In Step 346, a fabric-wide deployment of the modified network device redirect rules (generated in Step 344) is attempted. The fabric-wide attempt at deploying the network device rule is described in further detail below with respect to FIG. 5. Hereinafter, the process proceeds to Step 360 (see e.g., FIG. 3D).

Figure 3D:
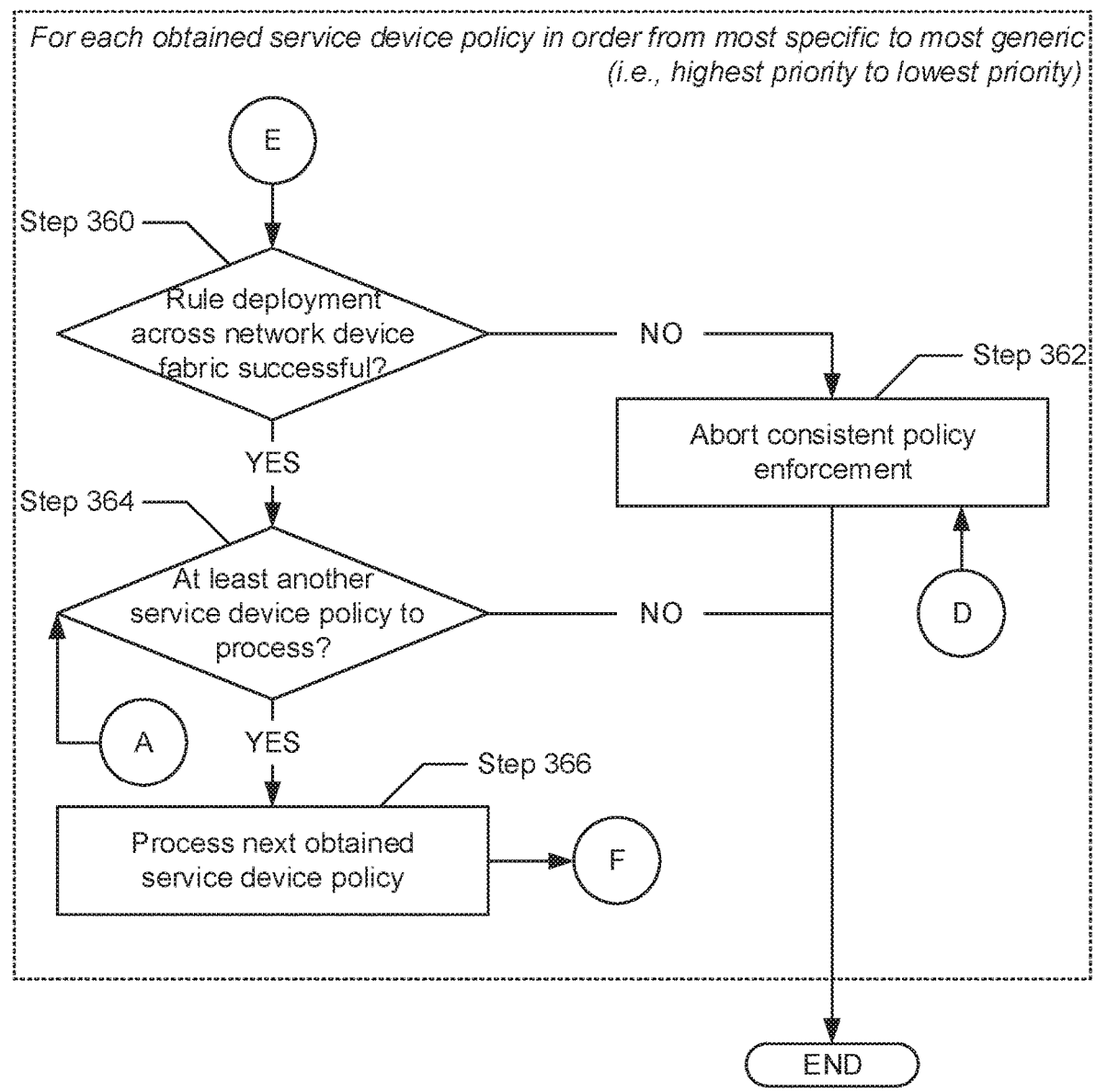

Turning to FIG. 3D, in Step 360, following the attempted fabric-wide deployment (in Step 346) of the modified network device redirect rules (generated in Step 344), a determination is made as to whether the aforementioned fabric-wide deployment attempt had been successful. Success of the fabric-wide deployment attempt may be contingent on a commitment of all the aforementioned modified network device redirect rules on and by all network devices forming the network device fabric (described above). Alternatively, failure of the fabric-wide deployment attempt may reflect that at least one network device, of the network device fabric, was not able to commit at least one of the aforementioned modified network device redirect rules. Accordingly, in one embodiment of the invention, if it is determined that the aforementioned fabric-wide deployment attempt had been a success, then the process proceeds to Step 364. On the other hand, in another embodiment of the invention, if it is alternatively determined that the aforementioned fabric-wide deployment attempt had been a failure, then the process proceeds to Step 362.

In Step 362, after determining (in Step 340 or Step 360) that the attempted fabric-wide deployment (in Step 328 or Step 346) of the modified network device redirect rules (generated in Step 326 or Step 344) had been a failure, consistent policy enforcement is aborted. In one embodiment of the invention, consistent policy enforcement may refer to offloading enforcement of a given service device policy onto the network device fabric. As described thus far, offloading enforcement of a given service device policy may entail the generation of one or more network device rules (i.e., network device redirect rules), derived from the given service device policy, which in turn yield various modified network device redirect rules that subsequently require fabric-wide deployment. Fabric wide-deployment may be contingent on the commitment of each and every generated modified network device redirect rule on/by each and every network device that forms the network device fabric. Should any generated modified network device redirect rule, derived from a given service device policy, not be committed (or accommodated) on/by at least one network device forming the network device fabric, fabric-wide maintenance and enforcement of the given service device policy, and thus consistent policy enforcement, cannot be achieved.

In Step 364, after determining (in Step 340 or Step 360) that the attempted fabric-wide deployment (in Step 328 or Step 346) of the modified network device redirect rules (generated in Step 326 or Step 344) had been a success, or after determining (in Step 304) that both the ISQ and the IDQ (identified in Step 302) reflect the ANY state—i.e., (ISQ, IDQ)=(ANY, ANY)—another determination is made as to whether at least another service device policy (of the service device policy set obtained in Step 300) still remains to be processed. Accordingly, in one embodiment of the invention, if it is determined that at least one other service device policy remains to be processed, then the process proceeds to Step 366. On the other hand, in another embodiment of the invention, if it is alternatively determined that zero service device policies remain to be processed, then the process alternatively ends.

In Step 366, after determining (in Step 364) that at least one other service device policy (of the service device policy set obtained in Step 300) remains to be processed, a next obtained service device policy is processed. Specifically, in one embodiment of the invention, the next obtained service device policy may refer to an obtained service device policy associated with a next highest processing priority based on a specificity (described above) of the obtained service device policy. Hereinafter, the process proceeds to Step 302 (see e.g., FIG. 3A).

While FIGS. 3A-3D outline a methodology for offloading service device policies, other methodologies may be used without departing from the scope of the invention. For example, the above-described methodology incorporates sequential network device rule processing. That is, for each set of modified network device redirect rules that is generated, a separate fabric-wide deployment transaction is attempted. However, in another embodiment of the invention, another methodology may be employed which alternatively incorporates batch network device rule processing. Through batch network device rule processing, all necessary sets of modified network device redirect rules (i.e., a modified network device redirect rule set batch) may be generated first, followed by the attempt of a single fabric-wide deployment transaction to disseminate the modified network device redirect rule set batch.

Figure 4:
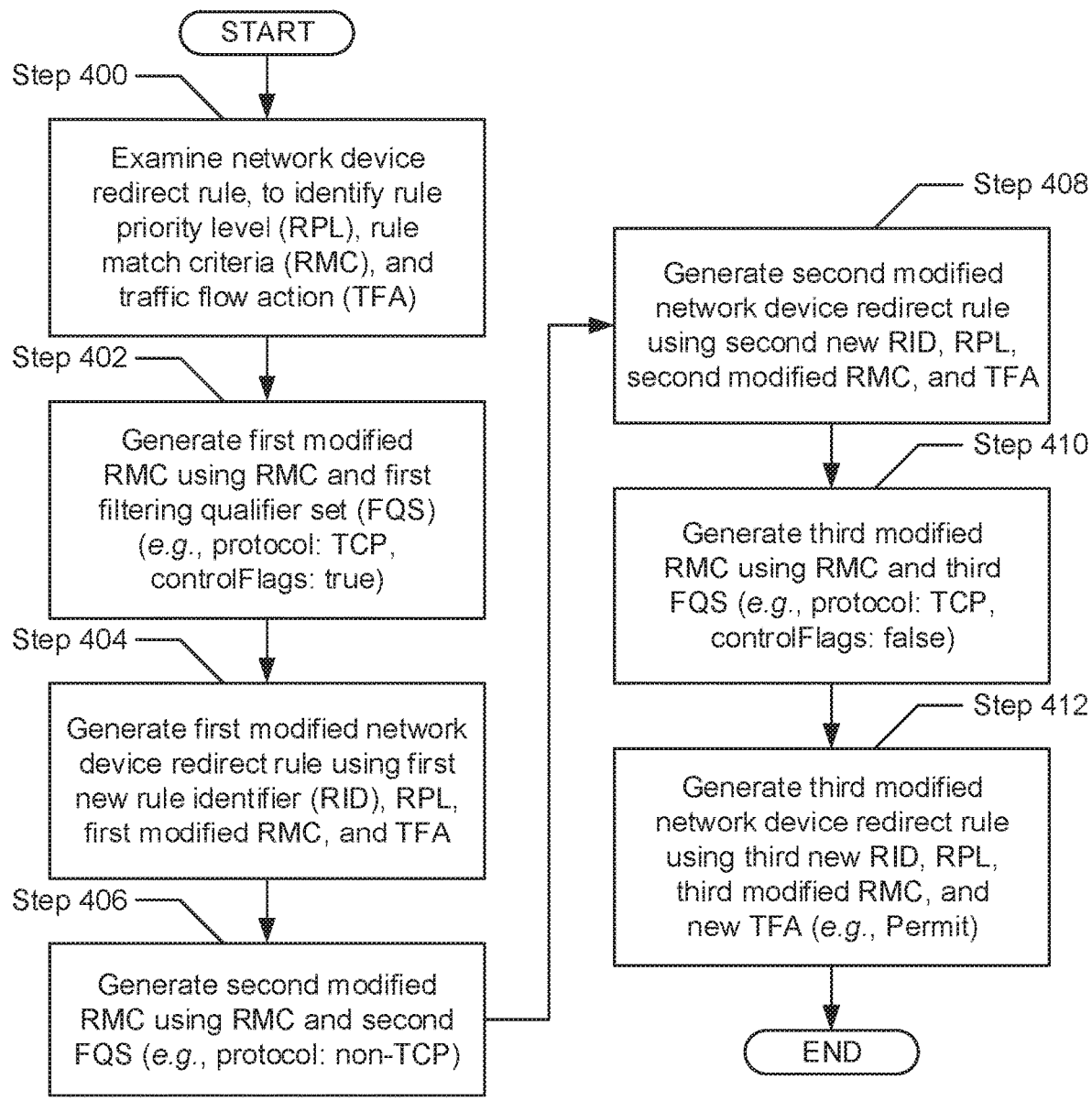
FIG. 4 shows a flowchart describing a method for generating modified network device redirect rules in accordance with one or more embodiments of the invention.

FIG. 4 shows a flowchart describing a method for generating modified network device redirect rules in accordance with one or more embodiments of the invention. The various steps outlined below may be performed by the control plane service (CPS) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, a network device redirect rule (generated while offloading one or more service device policies described in further detail above with respect to FIGS. 3A-3D) is examined. In one embodiment of the invention, examination of the network device redirect rule may identify at least the following subcomponents of a network device rule (see e.g., FIG. 2A): (a) the rule priority level (RPL), the rule match criteria (RMC), and the traffic flow action (TFA).

In Step 402, a first modified RMC is generated. Specifically, in one embodiment of the invention, generation of the first modified RMC may entail incorporating a first filtering qualifier set (FQS) into the RMC (identified in Step 400). Through incorporation of the first FQS, one or more additional qualifiers may supplement the RMC so that a respective modified network device redirect rule targets and matches with a more specific intercept network traffic flow. Further, the first FQS may include or specify an application-protocol qualifier (APQ) (see e.g., FIG. 2A) and a protocol-control qualifier (PCQ). The APQ may represent a meta-datum associated with a particular application and/or protocol pertinent to an intercept network traffic flow. The aforementioned protocol may refer to a set of rules or procedures by which the intercept network traffic flow is communicated between the origination and termination end points. Particularly, in one embodiment of the invention, the aforementioned APQ may specify the transmission control protocol (TCP), which may be used to isolate or target intercept network traffic flows that are communicated using the TCP.

On the other hand, in one embodiment of the invention, the PCQ may represent a meta-datum reflecting a protocol data unit (PDU) type associated with the one or more PDUs representative of an intercept network traffic flow. The aforementioned PDU type may reflect whether the PDU(s) of the intercept network traffic flow is/are directed to a control PDU type. Accordingly, the PCQ may reflect at least two possible states: (a) a TRUE state, indicative that the PDU(s) of the intercept network traffic flow is/are directed to a control PDU type; or (b) a FALSE state, indicative that the PDU(s) of the intercept network traffic flow is/are not directed to a control PDU type. Furthermore, a given PDU may be directed to a control PDU type if one or more control flags, specified in the given PDU, is/are enabled—e.g., reflects an ENABLED or TRUE state. Particularly, in one embodiment of the invention, the aforementioned PDQ may reflect the TRUE state, which may be used to isolate or target intercept network traffic flows that include control PDU type PDUs.

In one embodiment of the invention, the control flag(s), when enabled, may indicate the current connection state of a sought or established connection between the origination and termination end points. The sought or established connection may be facilitated through the protocol specified in the above-mentioned APQ. For example, with regards to the TCP, any given TCP-communicated PDU may specify various control flags, which are used for troubleshooting purposes or to control the handling of an associated connection. Should any of these various control flags be enabled, the given TCP-communicated PDU may be identified as a control PDU type and, subsequently, the PCQ may reflect the TRUE state. These various control flags may include, but are not limited to: (a) a synchronization (SYN) control flag, which when enabled, indicates that the establishment of a connection to the termination end point is being sought (or requested) by the origination end point; (b) an acknowledgement (ACK) control flag, which when enabled, indicates that network traffic flows from one end point to the other, and/or vice versa, has been successfully received by the opposing end point; (c) a finish (FIN) control flag, which when enabled, indicates that the graceful termination of an established connection between the origination and termination end points is being sought (or requested); and (d) a reset (RST) control flag, which when enabled, indicates that the abrupt termination of an established connection between the origination and termination end points is being sought (or requested) (i.e., usually performed when something is wrong with the established connection).

In Step 404, a first modified network device redirect rule (see e.g., FIG. 2C) is generated. Specifically, in one embodiment of the invention, the first modified network device redirect rule may be constructed from or using a first new rule identifier (RID), the RPL and the TFA (identified in Step 400), and the first modified RMC (generated in Step 402). The first new RID may or may not derive from (or be created based on) the RID specified in the network device redirect rule.

In Step 406, a second modified RMC is generated. Specifically, in one embodiment of the invention, generation of the second modified RMC may entail incorporating a second FQS into the RMC (identified in Step 400). Through incorporation of the second FQS, one or more additional qualifiers may supplement the RMC so that a respective modified network device redirect rule targets and matches with a more specific intercept network traffic flow. Further, the second FQS may include or specify an APQ (see e.g., FIG. 2A). The APQ may represent a meta-datum associated with a particular application and/or protocol pertinent to an intercept network traffic flow. The aforementioned protocol may refer to a set of rules or procedures by which the intercept network traffic flow is communicated between the origination and termination end points. Particularly, in one embodiment of the invention, the aforementioned APQ may specify a non-transmission control protocol (TCP)—e.g., User Datagram Protocol (UDP), Hypertext Transfer Protocol (HTTP), etc.—which may be used to isolate or target intercept network traffic flows that are communicated using non-TCP protocols.

In Step 408, a second modified network device redirect rule (see e.g., FIG. 2C) is generated. Specifically, in one embodiment of the invention, the second modified network device redirect rule may be constructed from or using a second new RID, the RPL and the TFA (identified in Step 400), and the second modified RMC (generated in Step 406). The second new RID may or may not derive from (or be created based on) the RID specified in the network device redirect rule.

In Step 410, a third modified RMC is generated. Specifically, in one embodiment of the invention, generation of the third modified RMC may entail incorporating a third FQS into the RMC (identified in Step 400). Through incorporation of the third FQS, one or more additional qualifiers may supplement the RMC so that a respective modified network device redirect rule targets and matches with a more specific intercept network traffic flow. Further, the third FQS may include or specify an APQ (see e.g., FIG. 2A) and a PCQ. The APQ may represent a meta-datum associated with a particular application and/or protocol pertinent to an intercept network traffic flow. The aforementioned protocol may refer to a set of rules or procedures by which the intercept network traffic flow is communicated between the origination and termination end points. Particularly, in one embodiment of the invention, the aforementioned APQ may specify the TCP, which may be used to isolate or target intercept network traffic flows that are communicated using the TCP.

On the other hand, in one embodiment of the invention, the PCQ may represent a meta-datum reflecting a protocol data unit (PDU) type associated with the one or more PDUs representative of an intercept network traffic flow. The aforementioned PDU type may reflect whether the PDU(s) of the intercept network traffic flow is/are directed to a control PDU type. Accordingly, the PCQ may reflect at least two possible states: (a) a TRUE state, indicative that the PDU(s) of the intercept network traffic flow is/are directed to a control PDU type; or (b) a FALSE state, indicative that the PDU(s) of the intercept network traffic flow is/are not directed to a control PDU type. Furthermore, a given PDU may be directed to a control PDU type if one or more control flags, specified in the given PDU, is/are enabled—e.g., reflects an ENABLED or TRUE state. Particularly, in one embodiment of the invention, the aforementioned PDQ may reflect the FALSE state, which may be used to isolate or target intercept network traffic flows that exclude control PDU type PDUs.

In Step 412, a third modified network device redirect rule (see e.g., FIG. 2C) is generated. Specifically, in one embodiment of the invention, the third modified network device redirect rule may be constructed from or using a third new RID, the RPL (identified in Step 400), the third modified RMC (generated in Step 410), and a new TFA. The third new RID may or may not derive from (or be created based on) the RID specified in the network device redirect rule. Further, the new TFA may replace the REDIRECT or NEXTHOP action (i.e., the TFA identified in Step 400), specified in the network device redirect rule, to a PERMIT action. Subsequently, intercept network traffic flows matching the third modified network device redirect rule may be permitted to proceed towards their respective destination(s)—i.e., termination end point(s). Meanwhile, network traffic flows that would have matched the network device redirect rule may have been redirected to a specific service device for inspection or a next hop, rather than continuing forward to their respective destination(s).

FIG. 5 shows a flowchart describing a method for consistently enforcing a modified network device redirect rule set in accordance with one or more embodiments of the invention. The various steps outlined below may be performed by the control plane service (CPS) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a network device set—forming a network device fabric—is identified. In one embodiment of the invention, the network device fabric may refer to the collection of interconnected network devices (see e.g., FIG. 1) that form a network.

In Step 502, a fabric device list is initialized. In one embodiment of the invention, the fabric device list may represent an abstract data type, a data object, or a data structure capable of retaining zero or more data values. Each data value, if any, may take form as a network device identifier (ID) associated with a network device of the network device set (identified in Step 500). A network device ID may refer to an arbitrary-length character string, expressed through any combination of letters, numbers, symbols, etc., which serve to uniquely identify a respective network device. Specifically, the fabric device list may reflect which network device(s), of the network device fabric, remain to commit a network device rule attempting to be consistently enforced. Furthermore, initialization of the fabric device list may entail populating the fabric device list to include a network device ID for each network device forming the network device fabric.

In Step 504, a committed device list is initialized. In one embodiment of the invention, the committed device list may represent an abstract data type, a data object, or a data structure capable of retaining zero or more data values. Each data value, if any, may take form as a network device ID associated with a network device of the network device set (identified in Step 500). A network device ID may refer to an arbitrary-length character string, expressed through any combination of letters, numbers, symbols, etc., which serve to uniquely identify a respective network device. Specifically, the committed device list may reflect which network device(s), of the network device fabric, have thus far committed a network device rule attempting to be consistently enforced. Furthermore, initialization of the committed device list may entail populating the committed device list with zero data values—effectively initializing the committed device list as an empty set.

In Step 506, a rule commit command is generated using a modified network device redirect rule set. In one embodiment of the invention, the modified network device redirect rule set may refer to any modified network device redirect rule generated while offloading one or more service device policies described in further detail above with respect to FIGS. 3A-3D. Further, the rule commit command may represent instructions directed to a network device, which may instruct the network device to attempt a commitment of the modified network device redirect rule set (see e.g., FIGS. 6A and 6B). Accordingly, the rule commit command may include or specify the modified network device redirect rule set.

Hereinafter, a subset of the remaining steps (i.e., Steps 508 through 520) outlined below may be performed for each network device ID (specified in the fabric device list initialized in Step 502 or updated in Step 514 (described below)).

In Step 508, the rule commit command (generated in Step 506) is transmitted. Specifically, in one embodiment of the invention, the rule commit command is transmitted to the network device identified by the network device ID (currently being processed from the fabric device list). Following the aforementioned transmission, in Step 510, a corresponding rule commit report is received from the network device. In one embodiment of the invention, the rule commit report may represent feedback from the network device regarding the attempt at committing the above-mentioned modified network device redirect rule set to which the rule commit command had referred. The rule commit report may indicate one of two possible outcomes—e.g., (a) the attempted commitment of the modified network device redirect rule set resulted in success; or (b) the attempted commitment of the modified network device redirect rule set resulted in failure.

In Step 512, a determination is made as to whether the rule commit report (received in Step 510) reflected that the attempted commitment of the modified network device redirect rule set resulted in success. Accordingly, in one embodiment of the invention, if it is determined that the rule commit report indicates the success of the attempted commitment of the modified network device redirect rule set, then the process proceeds to Step 514. On the other hand, in another embodiment of the invention, if it is alternatively determined that the rule commit report indicates the failure of the attempted commitment of the modified network device redirect rule set, then the process alternatively proceeds to Step 520.

In Step 514, after determining (in Step 512) that the attempted commitment of the modified network device redirect rule set, by the network device, resulted in success, the fabric device and committed device lists are updated. Specifically, in one embodiment of the invention, the network device ID (currently being processed from the fabric device list) may migrate from the fabric device list to the committed device list. That is, the aforementioned network device ID may be removed from the fabric device list and, subsequently, deposited or added to the committed device list. Further, the migration of the network device ID between lists may reflect that the network device, identified by the network device ID, represents one less network device required to consistently enforce the modified network device redirect rule set.

In Step 516, a determination is made as to whether at least another network device ID (from the fabric device list initialized in Step 502 or updated in Step 514) still remains to be processed. Accordingly, in one embodiment of the invention, if it is determined that at least one other network device ID remains to be processed, then the process proceeds to Step 518. On the other hand, in another embodiment of the invention, if it is alternatively determined that zero network device IDs remain to be processed—indicative that the fabric device list is empty—then the process alternatively ends, and consistent fabric-wide enforcement of the modified network device redirect rule set is achieved.

In Step 518, after determining (in Step 516) that at least one other network device ID (from the fabric device list initialized in Step 502 or updated in Step 514) remains to be processed, a next network device ID, retained in the fabric device list, is processed. Subsequently, in one embodiment of the invention, the process proceeds to Step 508, where the rule commit command (generated in Step 506) is transmitted to the next network device ID associated with another network device forming the network device fabric.

In Step 520, after alternatively determining (in Step 512) that the attempted commitment of the modified network device redirect rule set, by the network device, resulted in failure, the fabric-wide deployment of the modified network device redirect rule set (as well as any subsequently generated modified network device redirect rules (see e.g., FIGS. 3A-3D)) is aborted. In effect, in one embodiment of the invention, the attempt to consistently enforce a respective service device policy—from which at least the modified network device redirect rule set is derived—using the network device fabric in place of a service device, is terminated.

In Step 522, following the termination of the consistent enforcement attempt, a rule revoke command is generated using the modified network device redirect rule set. In one embodiment of the invention, the rule revoke command may represent instructions directed to a network device, which may instruct the network device to retract an earlier commitment of the modified network device redirect rule set. Accordingly, the rule revoke command may include or specify the modified network device redirect rule set.

In Step 524, the rule revoke command (generated in Step 522) is subsequently transmitted to one or more network devices, if any, identified by one or more network device IDs, respectively, retained in the committed device list (initialized in Step 504 or updated in Step 514). That is, in one embodiment of the invention, the rule revoke command may be issued to each network device that may have reported the successful commitment of the modified network device redirect rule set.

In one embodiment of the invention, upon receipt of the rule revoke command, a given network device may respond by, for example, performing the following steps: (a) extracting the modified network device redirect rule set from the received rule revoke command; (b) identifying a rule identifier (RID) (see e.g., FIG. 2A) associated with and specified in each of the one or more modified network device redirect rules; (c) performing a lookup on a lookup table—e.g., ternary content addressable memory (TCAM)—using the identified RID(s), to identify one or more lookup table entries representative of the earlier committed modified network device redirect rule set; and (d) removing or deleting the one or more identified lookup table entries from the lookup table.

Figure 6A:
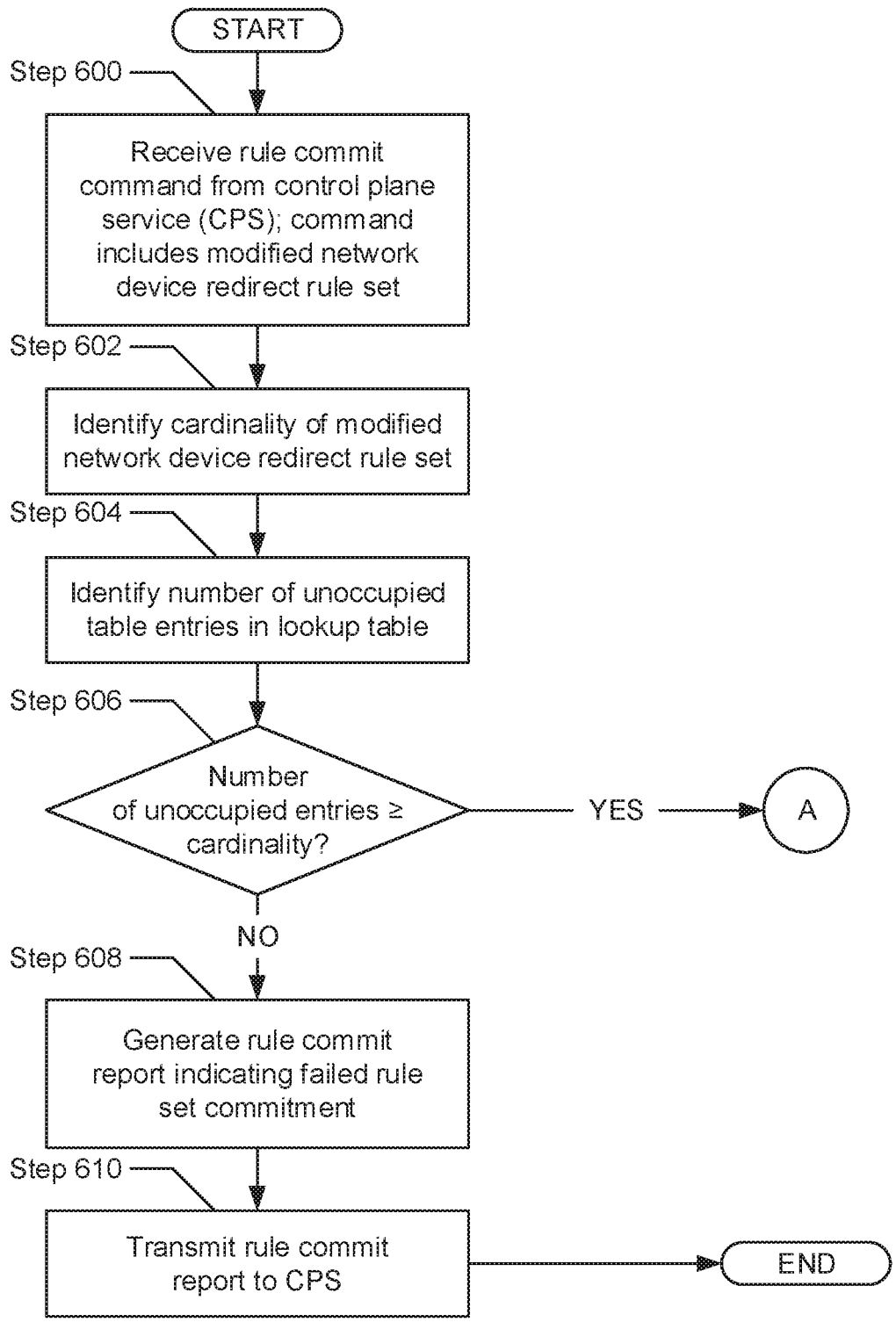
FIGS. 6A and 6B show flowcharts describing a method for committing a modified network device redirect rule set in accordance with one or more embodiments of the invention.
Figure 6B:
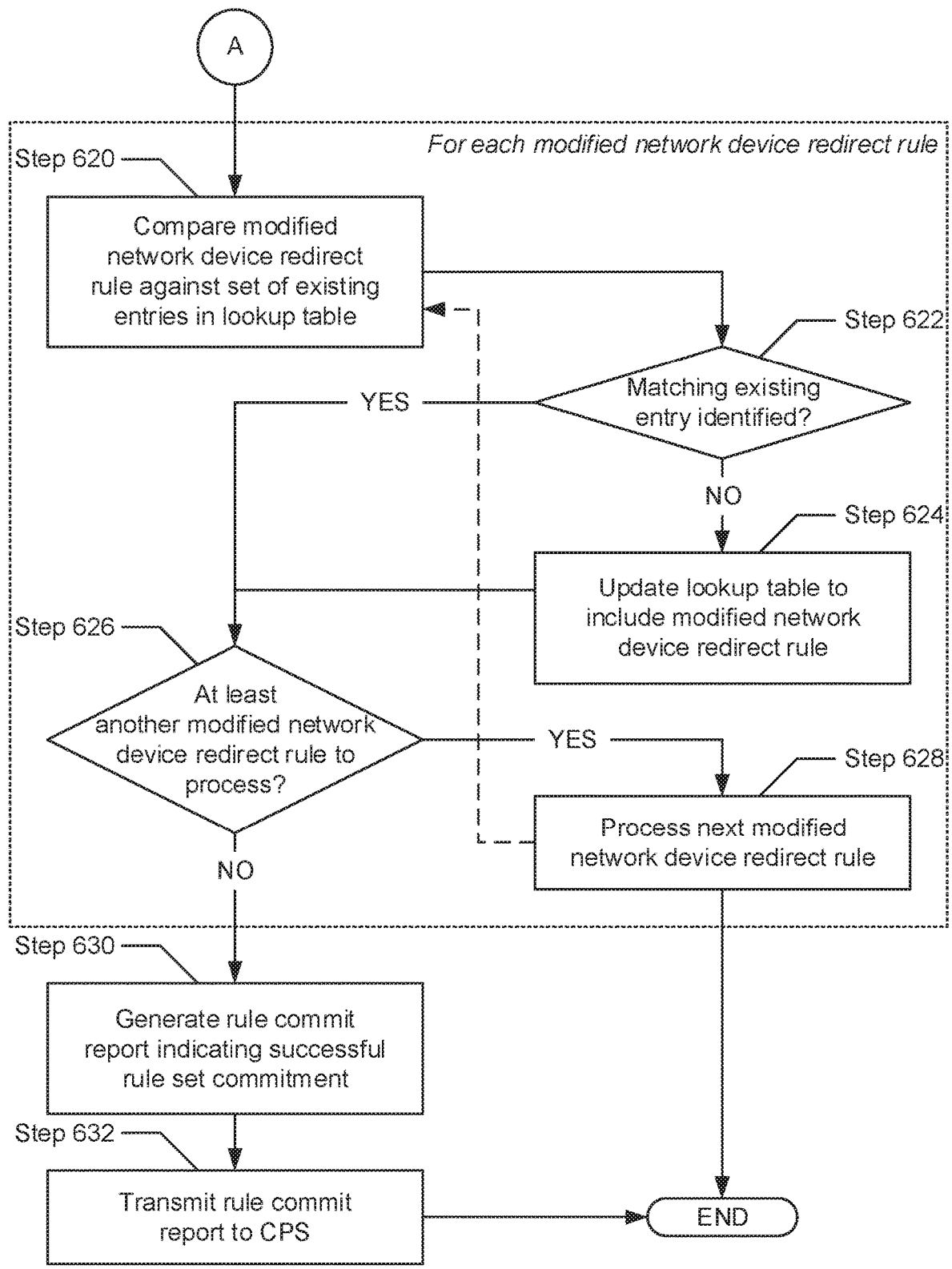

FIGS. 6A and 6B show flowcharts describing a method for committing a modified network device redirect rule set in accordance with one or more embodiments of the invention. The various steps outlined below may be performed by each network device (see e.g., FIG. 1) in a network device fabric. Further, while the various steps in the flowcharts are presented and described sequentially, one of ordinary skill will appreciate that some or all steps may be executed in different orders, may be combined or omitted, and some or all steps may be executed in parallel.

Turning to FIG. 6A, in Step 600, a rule commit command is received from the control plane service (CPS) (see e.g., FIG. 1). In one embodiment of the invention, the rule commit command may represent instructions directed to the network device, which may instruct the network device to attempt a commitment of a modified network device redirect rule set. Accordingly, the rule commit command may include or specify the aforementioned modified network device redirect rule set. Further, the modified network device redirect rule set may refer to one or more modified network device redirect rules generated while offloading one or more service device policies described in further detail above with respect to FIGS. 3A-3D.

In Step 602, a cardinality of the modified network device redirect rule set (obtained in Step 600) is identified. In one embodiment of the invention, the cardinality of a set may refer to the number of elements in the set. Accordingly, the cardinality of the modified network device redirect rule set may refer to the number of modified network device redirect rules included therein. The cardinality of the modified network device redirect rule set may be expressed using a numeric variable or value.

In Step 604, a number of unoccupied table entries in a lookup table is identified. In one embodiment of the invention, the lookup table may represent a data structure maintained on the network device, which may store and track various traffic management and/or access rules, followed by the network device, for processing certain network traffic flows. By way of an example, the lookup table may be implemented using ternary content addressable memory (TCAM). Furthermore, an unoccupied table entry may refer to memory space allocated to the lookup table that has not yet been populated with or consumed by a committed traffic management and/or access rule—e.g., a network device rule. The number of unoccupied table entries in the lookup table may be expressed using a numeric variable or value.

In Step 606, a determination is made as to whether the number of unoccupied table entries in the lookup table (identified in Step 604) matches or exceeds the cardinality of the modified network device redirect rule set (identified in Step 602). Accordingly, in one embodiment of the invention, if it is determined that the number of unoccupied table entries is greater than or equal to the aforementioned cardinality, then the process proceeds to Step 620 (see e.g., FIG. 6B). On the other hand, in another embodiment of the invention, if it is alternatively determined that the number of unoccupied table entries is less than the aforementioned cardinality, then the process alternatively proceeds to Step 608.

In Step 608, after determining (in Step 606) that the number of unoccupied table entries in the lookup table (identified in Step 604) is less than the cardinality of the modified network device redirect rule set (identified in Step 602), a rule commit report is generated. Specifically, in one embodiment of the invention, the rule commit report may represent feedback from the network device regarding the attempt at committing the modified network device redirect rule set (obtained in Step 600). Further, the rule commit report may indicate that the attempted commitment of the modified network device redirect rule set resulted in failure. Failure may have resulted because the aforementioned cardinality exceeded the aforementioned number of unoccupied (or available) table entries and, accordingly, the entirety of the obtained modified network device redirect rule set could not be accommodated therein. Thereafter, in Step 610, the rule commit report (generated in Step 608) is subsequently transmitted to the CPS.

Turning to FIG. 6B, hereinafter, a subset of the remaining steps (i.e., Steps 620 through 628) outlined below may be performed for each modified network device redirect rule (of the modified network device redirect rule set obtained in Step 600). In Step 620, after determining (in Step 606) that the number of unoccupied table entries in the lookup table (identified in Step 604) matches or exceeds the cardinality of the modified network device redirect rule set (identified in Step 602), the modified network device redirect rule (currently being processed from the modified network device redirect rule set) is compared against a set of existing table entries in the above-mentioned lookup table.

In Step 622, based on the comparison (performed in Step 620), a determination is made as to whether the modified network device redirect rule matches an existing table entry in the lookup table. Matching of the modified network device redirect rule to an existing table entry may reflect that each and every subcomponent—e.g., rule identifier (RID), rule priority level (RPL), rule match criteria (RMC), and traffic flow action (TFA) (see e.g., FIG. 2A)—of the modified network device redirect rule is specified in the identified existing table entry. Accordingly, in one embodiment of the invention, if it is determined that the modified network device redirect rule matches an existing table entry in the lookup table, then the process proceeds to Step 626. On the other hand, if it is alternatively determined that the modified network device redirect rule does not match any of the existing (i.e., occupied) table entries in the lookup table, then the process alternatively proceeds to Step 624.

In Step 624, after determining (in Step 622) that the modified network device redirect rule does not match any existing table entry in the lookup table based on the comparison (performed in Step 620), the lookup table is updated. Specifically, in one embodiment of the invention, the lookup table may be updated to include or accommodate the modified network device redirect rule (currently being processed) therein.

In Step 626, following the update to the lookup table (in Step 624) or after determining (in Step 622) that the modified network device redirect rule matches an existing table entry in the lookup table based on the comparison (performed in Step 620), a determination is made as to whether at least another modified network device redirect rule (from the modified network device redirect rule set obtained in Step 600) still remains to be processed. Accordingly, in one embodiment of the invention, if it is determined that at least one other modified network device redirect rule remains to be processed, then the process proceeds to Step 628. On the other hand, in another embodiment of the invention, if it is alternatively determined that no more modified network device redirect rules remain to be processed, then the process alternatively proceeds to Step 630.

In Step 628, after determining (in Step 626) that at least one other modified network device redirect rule (from the modified network device redirect rule set obtained in Step 600) remains to be processed, a next modified network device redirect rule is processed. Subsequently, in one embodiment of the invention, the process proceeds to Step 620, where the next modified network device redirect rule is compared against a set of existing (i.e., occupied) table entries in the above-mentioned lookup table.

In Step 630, after alternatively determining (in Step 626) that no more modified network device redirect rules (from the modified network device redirect rule set obtained in Step 600) remain to be processed, a rule commit report is generated. In one embodiment of the invention, the rule commit report may represent feedback from the network device regarding the attempt at committing the modified network device redirect rule set. Further, the rule commit report may indicate that the attempted commitment of the modified network device redirect rule set resulted in success. Success may have resulted because: (a) the number of unoccupied table entries in the lookup table matches or exceeds the cardinality of the modified network device redirect set, thereby offering sufficient memory space for the accommodation of the modified network device redirect rule set in part or in entirety; or (b) one or more of the modified network device redirect rules (of the obtained modified network device redirect rule set) already exist in the lookup table. Thereafter, in Step 632, the rule commit report (generated in Step 630) is subsequently transmitted to the CPS.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a network device fabric, comprising:
   obtaining, from a service device, a first service device policy;
   examining the first service device to identify a first set of qualifiers;
   performing a first lookup on a group assignment table using the first set of qualifiers, to identify a first set of groups;
   deriving, from the first service device policy, a first network device redirect rule comprising the first set of groups;
   deriving, from the first network device redirect rule, a first modified network device redirect rule set; and
   making a first attempt at a fabric-wide deployment of the first modified network device redirect rule set,
   wherein, based on a success of the first attempt, enforcement of the first service device policy is offloaded onto the network device fabric.

2. The method of claim 1, wherein the first set of qualifiers comprises an intercept source qualifier (ISQ) reflecting a LISTED state and an intercept destination qualifier (IDQ) reflecting an ANY state, wherein the first set of groups comprises at least one source group.

3. The method of claim 1, wherein the first set of qualifiers comprises an intercept source qualifier (ISQ) reflecting an ANY state and an intercept destination qualifier (IDQ) reflecting a LISTED state, wherein the first set of groups comprises at least one destination group.

4. The method of claim 1, wherein the first set of qualifiers comprises an intercept source qualifier (ISQ) reflecting a LISTED state and an intercept destination qualifier (IDQ) reflecting the LISTED state, wherein the first set of groups comprises at least one source group and at least one destination group.

5. The method of claim 1, wherein making the first attempt at the fabric-wide deployment of the first modified network device redirect rule set, comprises:
   identifying a network device set that forms the network device fabric;
   generating a rule commit command using the first modified network device redirect rule set; and
   transmitting the rule commit command to each network device of the network device set.

6. The method of claim 5, wherein the success of the first attempt, comprises:
   in response to transmitting the rule commit command:
      receiving a rule commit report from each network device of the network device set,
      wherein all rule commit reports indicate a successful commitment of the first modified network device redirect rule set.

7. The method of claim 1, wherein the first modified network device redirect rule set comprises a first modified network device redirect rule, wherein a derivation of the first modified network device redirect rule, comprises:
examining the first network device redirect rule to identify a rule priority level (RPL), rule match criteria (RMC), and a traffic flow action (TFA);
incorporating a first filtering qualifier set (FQS) into the RMC, to generate a first modified RMC; and
constructing the first modified network device redirect rule using a first new rule identifier (RID), the RPL, the first modified RMC, and the TFA.

8. The method of claim 7, wherein the first FQS comprises an application-protocol qualifier (APQ) specifying a transmission control protocol (TCP) and a protocol-control qualifier (PCQ) reflecting a TRUE state.

9. The method of claim 7, wherein the first modified network device redirect rule set further comprises a second modified network device redirect rule, wherein a derivation of the second network device redirect rule, comprises:
incorporating a second FQS into the RMC, to generate a second modified RMC; and
constructing the second modified network device redirect rule using a second new RID, the RPL, the second modified RMC, and the TFA.

10. The method of claim 9, wherein the second FQS comprises an application-protocol qualifier (APQ) specifying a non-transmission control protocol (non-TCP).

11. The method of claim 9, wherein the first modified network device redirect rule set further comprises a third modified network device redirect rule, wherein a derivation of the third network device redirect rule, comprises:
incorporating a third FQS into the RMC, to generate a third modified RMC; and
constructing the third modified network device redirect rule using a third new RID, the RPL, the third modified RMC, and a new TFA.

12. The method of claim 11, wherein the third FQS comprises an application-protocol qualifier (APQ) specifying a transmission control protocol (TCP) and a protocol-control qualifier (PCQ) reflecting a FALSE state.

13. The method of claim 11, wherein the new TFA reflects a PERMIT action.

14. The method of claim 1, further comprising:
obtaining, from the service device, a second service device policy;
examining the second service device policy to identify a second set of qualifiers;
performing a second lookup on the group assignment table using the second set of qualifiers, to identify a second set of groups;
deriving, from the second service device policy, a second network device redirect rule comprising the second set of groups;
deriving, from the second network device redirect rule, a second modified network device redirect rule set; and
making a second attempt at the fabric-wide deployment of the second modified network device redirect rule set, wherein the second attempt fails.

15. The method of claim 14, wherein failure of the second attempt, comprises:
identifying a network device set that forms the network device fabric;
generating a rule commit command using the second modified network device redirect rule set;
transmitting the rule commit command to each network device of the network device set; and
in response to transmitting the rule commit command:
receiving a rule commit report from each network device of the network device set,
wherein at least one rule commit report indicates a failed commitment of the second modified network device redirected rule set.

16. The method of claim 1, further comprising:
prior to performing the first lookup:
obtaining, from the service device, a second service device policy;
establishing a processing prioritization based on a first specificity of the first service device policy and a second specific of the second service device policy; and
based on the processing prioritization:
offloading enforcement of the second service device policy, prior to offloading enforcement of the first service device policy, onto the network device fabric.

17. The method of claim 16, wherein establishing the processing prioritization based on the first and second specificities, comprises:
examining the second service device policy to identify at least a second set of qualifiers;
measuring the first specificity based at least on a first cardinality of the first set of qualifiers;
measuring the second specificity based at least on a second cardinality of the second set of qualifiers;
making a determination, based on the second specificity exceeding the first specificity, that the second service device policy is more specific than the first service device policy; and
establishing the processing prioritization based on the determination.

18. A non-transitory computer readable medium (CRM) comprising computer readable program code, which when executed by a computer processor, enables the computer processor to:
obtain, from a service device, a service device policy;
examine the service device to identify a set of qualifiers;
perform a lookup on a group assignment table using the set of qualifiers, to identify a set of groups;
derive, from the service device policy, a network device redirect rule comprising the set of groups;
derive, from the network device redirect rule, a modified network device redirect rule set; and
make an attempt at a fabric-wide deployment of the modified network device redirect rule set,
wherein, based on a success of the attempt, enforcement of the service device policy is offloaded onto a network device fabric.

19. A system, comprising:
a network device fabric comprising a plurality of interconnected network devices;
a service device directly-connected to a network device of the network device fabric; and
a control plane service (CPS) operatively connected to the network device fabric, and programmed to:
obtain, from the service device, a service device policy;
examine the service device to identify a set of qualifiers;
perform a lookup on a group assignment table using the set of qualifiers, to identify a set of groups;
derive, from the service device policy, a network device redirect rule comprising the set of groups;
derive, from the network device redirect rule, a modified network device redirect rule set; and make an attempt at a fabric-wide deployment of the modified network device redirect rule set,
wherein, based on a success of the attempt, enforcement of the service device policy is offloaded onto the network device fabric.

20. The system of claim 19, wherein the service device is a network security device, a network filtering device, a network data cache, or a network load balancing device.

* * * * *